US011683292B2

(12) United States Patent
Chen

(10) Patent No.: US 11,683,292 B2
(45) Date of Patent: Jun. 20, 2023

(54) PRIVATE CLOUD ROUTING SERVER CONNECTION MECHANISM FOR USE IN A PRIVATE COMMUNICATION ARCHITECTURE

(71) Applicant: KINGSTON DIGITAL, INC., Fountain Valley, CA (US)

(72) Inventor: Ben Wei Chen, Fountain Valley, CA (US)

(73) Assignee: KINGSTON DIGITAL, INC., Fountain Valley, CA (US)

(*) Notice: Subject to any disclaimer, the term of this patent is extended or adjusted under 35 U.S.C. 154(b) by 127 days.

(21) Appl. No.: 17/174,841

(22) Filed: Feb. 12, 2021

(65) Prior Publication Data
US 2021/0185017 A1    Jun. 17, 2021

Related U.S. Application Data

(63) Continuation-in-part of application No. 16/807,481, filed on Mar. 3, 2020, now Pat. No. 11,356,417,
(Continued)

(51) Int. Cl.
*H04L 9/40* (2022.01)
*H04W 12/069* (2021.01)
(Continued)

(52) U.S. Cl.
CPC ........ *H04L 63/0272* (2013.01); *H04L 63/029* (2013.01); *H04L 63/08* (2013.01);
(Continued)

(58) Field of Classification Search
CPC ... H04L 63/0272; H04L 63/029; H04L 63/08; H04L 63/083; H04L 63/10; H04L 63/102;
(Continued)

(56) References Cited

U.S. PATENT DOCUMENTS

| 5,408,618 A | 4/1995 | Aho et al. |
| 6,438,594 B1 | 8/2002 | Bowman-Amuah |

(Continued)

FOREIGN PATENT DOCUMENTS

| GB | 2341523 | 3/2000 |
| WO | WO2011133908 | 10/2011 |
| WO | 2019/090153 A1 | 5/2019 |

OTHER PUBLICATIONS

M. Baldi, L. De Marco, F. Risso and L. Torrero, "Providing End-to-End Connectivity to SIP User Agents Behind NATs," 2008 IEEE International Conference on Communications, 2008, pp. 5902-5908, doi: 10.1109/ICC.2008.1103. (Year: 2008).*
(Continued)

*Primary Examiner* — Michael Simitoski
(74) *Attorney, Agent, or Firm* — Shih IP Law Group, PLLC

(57) ABSTRACT

A method for use with a public cloud network is disclosed. The method includes setting up at least one private cloud routing server (PCRS) and at least one smart device client on the side of the PCRS in a client server relationship. It also includes setting up at least another smart device client on the side of the PCCBS in a client server relationship with the at least one private cloud call-back server (PCCBS). The private cloud call-back server acts as a middleman to relay communication between the smart device client on the side of the PCCBS and the private cloud routing server. The PCCBS will call back the private cloud routing server on demand based on the smart device client request. The at least one private cloud call-back server includes a first message box associated therewith.

16 Claims, 17 Drawing Sheets

Related U.S. Application Data which is a continuation of application No. 14/741,145, filed on Jun. 16, 2015, now Pat. No. 10,601,810, which is a continuation-in-part of application No. 14/663,244, filed on Mar. 19, 2015, now Pat. No. 9,935,930, which is a continuation-in-part of application No. 14/526,393, filed on Oct. 28, 2014, now Pat. No. 9,781,087, which is a continuation-in-part of application No. 14/450,104, filed on Aug. 1, 2014, now Pat. No. 10,237,253, which is a continuation-in-part of application No. 13/229,285, filed on Sep. 9, 2011, now Pat. No. 9,203,807.

(51) Int. Cl.
  *H04W 12/06* (2021.01)
  *H04L 67/1001* (2022.01)

(52) U.S. Cl.
  CPC ............ *H04L 63/083* (2013.01); *H04L 63/10* (2013.01); *H04L 63/102* (2013.01); *H04L 63/164* (2013.01); *H04L 67/1001* (2022.05); *H04W 12/06* (2013.01); *H04W 12/069* (2021.01)

(58) Field of Classification Search
  CPC ... H04L 63/164; H04L 67/10; H04L 67/1001; H04L 67/141; H04L 12/06; H04L 12/069
  See application file for complete search history.

(56) References Cited

U.S. PATENT DOCUMENTS

| | | |
|---|---|---|
| 6,563,515 B1 | 5/2003 | Reynolds et al. |
| 6,779,004 B1 | 8/2004 | Zintel |
| 6,954,790 B2 | 10/2005 | Forslow |
| 6,978,314 B2 | 12/2005 | Tarr |
| 6,981,041 B2 | 12/2005 | Araujo et al. |
| 7,068,680 B1 | 6/2006 | Kaltenmark et al. |
| 7,120,429 B2 | 10/2006 | Minear et al. |
| 7,219,140 B2 | 5/2007 | Marl et al. |
| 7,293,077 B1 | 11/2007 | Teo et al. |
| 7,328,256 B2 | 2/2008 | Taoyama et al. |
| 7,392,034 B2 | 6/2008 | Westman et al. |
| 7,408,882 B2 | 8/2008 | Abdo et al. |
| 7,467,198 B2 | 12/2008 | Goodman et al. |
| 7,487,230 B2 | 2/2009 | Gu et al. |
| 7,558,846 B2 | 7/2009 | Gu et al. |
| 7,562,393 B2 | 7/2009 | Buddhikot et al. |
| 7,602,756 B2 | 10/2009 | Gu et al. |
| 7,627,653 B2 | 12/2009 | Taoyama et al. |
| 7,630,341 B2 | 12/2009 | Buddhikot et al. |
| 7,636,764 B1 | 12/2009 | Fein |
| 7,640,340 B1 | 12/2009 | Stapp et al. |
| 7,640,546 B2 | 12/2009 | Zarenin et al. |
| 7,647,203 B1 | 1/2010 | Herz |
| 7,676,690 B2 | 3/2010 | Bucher et al. |
| 7,788,656 B2 | 8/2010 | Harper |
| 7,810,148 B2 | 10/2010 | Bed-Shacher et al. |
| 7,978,714 B2 | 7/2011 | Rao et al. |
| 8,045,000 B2 | 10/2011 | Davidson et al. |
| 8,069,217 B2 | 11/2011 | Lo et al. |
| 8,170,209 B2 | 5/2012 | Peng et al. |
| 8,300,056 B2 | 10/2012 | Nugent et al. |
| 8,412,798 B1 | 4/2013 | Wang |
| 8,661,084 B1* | 2/2014 | McKinnon ............. G06Q 10/10 709/206 |
| 8,732,853 B1 | 5/2014 | Byrne |
| 9,155,117 B2 | 10/2015 | Banavara |
| 9,558,341 B1* | 1/2017 | Allababidi ............. G06F 21/45 |
| 9,674,301 B2* | 6/2017 | Ma ......................... H04L 67/60 |
| 9,729,625 B1 | 8/2017 | Davidson |
| 9,781,087 B2 | 10/2017 | Chen |
| 9,935,930 B2 | 4/2018 | Chen |
| 11,016,942 B2 | 5/2021 | Brand |
| 2002/0046296 A1* | 4/2002 | Kloba ................. G06F 16/9577 709/248 |
| 2002/0147810 A1 | 10/2002 | Traversat |
| 2004/0078486 A1* | 4/2004 | Salahshoor ............. H04L 67/02 709/245 |
| 2004/0223469 A1 | 11/2004 | Bahl et al. |
| 2005/0286476 A1 | 12/2005 | Crosswy et al. |
| 2006/0271968 A1 | 11/2006 | Zellner |
| 2006/0291434 A1 | 12/2006 | Gu et al. |
| 2007/0165579 A1 | 7/2007 | Delibie et al. |
| 2007/0294368 A1 | 12/2007 | Bomgaars et al. |
| 2008/0016491 A1 | 1/2008 | Doepke |
| 2008/0019333 A1 | 1/2008 | Kharia et al. |
| 2008/0115141 A1* | 5/2008 | Welingkar .......... G06F 11/1464 718/104 |
| 2008/0162698 A1 | 7/2008 | Hopen et al. |
| 2008/0201751 A1 | 8/2008 | Ahmed et al. |
| 2008/0301794 A1 | 12/2008 | Lee |
| 2009/0019492 A1 | 1/2009 | Grasset |
| 2009/0049053 A1* | 2/2009 | Barker ................. G06F 16/2308 |
| 2009/0086688 A1 | 4/2009 | Kvache et al. |
| 2009/0092133 A1 | 4/2009 | Mok et al. |
| 2009/0106394 A1 | 4/2009 | Lin et al. |
| 2009/0129301 A1 | 5/2009 | Belimpasakis |
| 2009/0303973 A1 | 12/2009 | Patil |
| 2010/0036955 A1 | 2/2010 | Hopen et al. |
| 2010/0188987 A1 | 7/2010 | Azimi et al. |
| 2010/0205309 A1 | 8/2010 | Skog |
| 2010/0251335 A1 | 9/2010 | Srisuresh |
| 2010/0299385 A1* | 11/2010 | Root ................. H04M 3/42365 709/204 |
| 2010/0332626 A1 | 12/2010 | Jonsson et al. |
| 2011/0055374 A1* | 3/2011 | Christenson ........ H04L 61/4511 709/224 |
| 2011/0107379 A1 | 5/2011 | Lejoie et al. |
| 2011/0138063 A1* | 6/2011 | Wu ...................... H04L 61/5076 709/227 |
| 2011/0145418 A1 | 6/2011 | Pratt et al. |
| 2011/0145821 A1 | 6/2011 | Philipson et al. |
| 2011/0161525 A1* | 6/2011 | Tanimoto ............. H04L 12/4675 709/249 |
| 2012/0023796 A1 | 2/2012 | Waltersdorf |
| 2012/0030584 A1 | 2/2012 | Brian |
| 2012/0036233 A1 | 2/2012 | Evenden |
| 2012/0042102 A1 | 2/2012 | Chung et al. |
| 2012/0042275 A1 | 2/2012 | Neerudu et al. |
| 2012/0081382 A1 | 4/2012 | Lindahl et al. |
| 2012/0084798 A1 | 4/2012 | Reeves et al. |
| 2012/0236796 A1 | 9/2012 | Lazaridis et al. |
| 2012/0307141 A1 | 12/2012 | Millet et al. |
| 2012/0311329 A1 | 12/2012 | Medina et al. |
| 2013/0024545 A1 | 1/2013 | Sheppard et al. |
| 2013/0041931 A1 | 2/2013 | Brand |
| 2013/0067550 A1 | 3/2013 | Chen et al. |
| 2013/0159491 A1 | 6/2013 | Hara |
| 2013/0177891 A1 | 7/2013 | Hammerschmidt |
| 2013/0231146 A1 | 9/2013 | Mathias et al. |
| 2014/0089441 A1* | 3/2014 | Lukaszyk ............. H04L 51/043 709/206 |
| 2014/0136623 A1 | 5/2014 | Kvache et al. |
| 2014/0141721 A1 | 5/2014 | Kim et al. |
| 2014/0289868 A1 | 9/2014 | Byrne et al. |
| 2014/0306865 A1 | 10/2014 | Pan et al. |
| 2014/0359477 A1 | 12/2014 | Chen |
| 2014/0372517 A1 | 12/2014 | Zuili |
| 2015/0117840 A1* | 4/2015 | Parente ................. H04N 21/854 386/282 |
| 2015/0288678 A1 | 10/2015 | Chen |
| 2015/0327313 A1 | 11/2015 | Kim et al. |
| 2018/0331942 A1* | 11/2018 | Janczukowicz ......... H04L 67/02 |

OTHER PUBLICATIONS

Mahy, R. et al. "Traversal Using Relays around NAT (TURN): Relay Extensions to Session Traversal Utilities for NAT (STUN)", Apr. 2010. (Year: 2010).*

(56) References Cited

OTHER PUBLICATIONS

H. Shon, S. Han and S. Kang, "A Study on Direct Connection Method from Outside NAT to the Inside," 2008 Third International Conference on Convergence and Hybrid Information Technology, 2008, pp. 218-221, doi: 10.1109/ICCIT.2008.36. (Year: 2008).*

Symantec. "Symantec Endpoint Protection Getting Started Guide", 2007. (Year: 2007).*

N. Enomoto, H. Yoshimi, Chinryu Sai, Y. Hidaka, K. Takagi and A. Iwata, "A secure and easy remote access technology," 6th Asia-Pacific Symposium on Information and Telecommunication Technologies, 2005, pp. 364-368, doi: 10.1109/APSITT.2005.203686. (Year: 2005).*

Z. Xu, et al. "WAVNet: Wide-Area Network Virtualization Technique for Virtual Private Cloud", 2011 International Conference on Parallel Processing, 2011, pp. 285-294, doi: 10.1109/ICPP.2011.90. (Year: 2011).

Malik, Om (May 22, 2009) "How Pogoplug Works" gigaom.com http:/gigaom.com/2009/05/22/how-pogoplug-works/.

Mldonkey (Oct. 5, 2010) "WhatFirewallPortsToOpen" mldonkey.sourceforge.net http://mldonkey.sourceforge.net/WhatFirewallPortsToOpen.

Rue Liu, "Iomega Home Media Hard Drive Cloud Edition Review—SlashGear", Jun. 2011, SlashGear, http://www.slashgear.com/iomega-home-media-hard-drive-cloud-edition-review-14156840/.

Filename "Sep. 2012 WiFi-Miracast brochure.pdf" Miracast-paper: "Wi-Fi Certified MiracastTM: Extending the Wi-Fi experience to seamless video display" published by Wi-Fi Alliance on Sep. 19, 2012.

Filename: "WiFi Miracast Demo video—Screenshots and Transcript.pdf" Screenshots and Transcripts of "Wi-Fi Certified MiracastTM Demo at 2013 CES" video https://www.youtube.com/watch?v=cYagdOp9y7E published by Wi-Fi Alliance on Jan. 9, 2013.

Filename: "Jul. 2011 Samsung Remote App.pdf Samsung App Profile: Remote App" published published online on Jul. 30, 2011.

Filename: "Mar. 2013 panasonic-my-home-screen-smart-tv.pdf" "Panasonic My Home Screen Smart TV Interface" published online on Mar. 6, 2013.

Filename: "Jul. 2012 samsung-tv-remote-app" "Samsung TV Remote app not working for some 2012" online article published on Jul. 18, 2012.

Craig Ellison, "Iomega Home Media Network Hard Drive—Cloud Edition Reviewed", SmallCloudBuilder.com, Mar. 29, 2011, http://www.smallcloudbuilder.com/storage/reviews/311-iomega-home-media-network-hard-drive-cloud-edition-reviewed.

Guy McDowell, "How Does a Router Work", Oct. 2009, http://www.makeuseof.com/tag/technology-explained-how-does-a-router-work/.

Use Yahoo Messenger for a Video or Audio Conference, Mar. 2005, http://education.ucf.edu/techfac/docs/videochattutorial.pdf.

Matt Smollinger, "Iomega Home Media Network Hard Drive—Cloud Edition Reviewed", Mar. 2011, https://www.smallnetbuilder.com/other/cloud/cloud-storage/311-iomega-home-media-network-hard-drive-cloud-edition-reviewed.

Iomega—an EMC Company, "Iomgea StorCenter ix4-200d User Guide", Jul. 2010, http://www.wiredzone.com/mmenglish/others/32026148-manual.pdf.

Seagate, Seagate Access for Personal Cloud User Manual, Apr. 2015, Seagate.com, https://www.seagate.com/manuals/network-storage/seagate-personal-cloud/seagate-access/sdrive/.

* cited by examiner

PRIVATE CLOUD ROUTING SERVER CONNECTION MECHANISM FOR USE IN A PRIVATE COMMUNICATION ARCHITECTURE

CROSS-REFERENCE TO RELATED APPLICATION

This application is a continuation-in-part of U.S. patent application Ser. No. 16/807,481, filed Mar. 3, 2020; which is a continuation of U.S. application Ser. No. 14/741,145 filed Jun. 16, 2015, entitled "PRIVATE CLOUD ROUTING SERVER CONNECTION MECHANISM FOR USE IN A PRIVATE COMMUNICATION ARCHITECTURE", which is a continuation-in-part of U.S. patent application Ser. No. 14/663,244, filed Mar. 19, 2015, entitled "PRIVATE AND SECURE COMMUNICATION ARCHITECTURE WITHOUT UTILIZING A PUBLIC CLOUD BASED ROUTING SERVER", which is a continuation-in-part of U.S. patent application Ser. No. 14/526,393, filed Oct. 28, 2014, entitled "PRIVATE AND SECURE COMMUNICATION ARCHITECTURE WITHOUT UTILIZING A PUBLIC CLOUD BASED ROUTING SERVER", which is a continuation-in-part of U.S. patent application Ser. No. 14/450,104, filed Aug. 1, 2014, entitled "PRIVATE CLOUD ROUTING SERVER, PRIVATE NETWORK SERVICE AND SMART DEVICE CLIENT ARCHITECTURE WITHOUT UTILIZING A PUBLIC CLOUD BASED ROUTING SERVER," which is a continuation-in-part of U.S. patent application Ser. No. 13/229,285, filed Sep. 9, 2011, entitled "PRIVATE CLOUD SERVER AND CLIENT ARCHITECTURE WITHOUT UTILIZING A ROUTING SERVER," all of which are incorporated herein by reference in their entireties.

FIELD OF THE INVENTION

The present invention relates generally to networking and more particularly to the use of private cloud networks.

BACKGROUND OF THE INVENTION

In the Internet connected environment, the Smart Device Clients including smart phone, tablet, eBook reader, notebook, PC and various smart gadgets are ubiquitous and omnipresent. Other than connectivity, one of the values of the Smart Device Clients is to be able to connect at any time and any place to retrieve services from one or many serving parties or servers. The services include audio, video contents, live or archived information, and execution of applications, social media, messaging, email, storage, backup, calendar, contact, synchronization, sharing, remote desktop, Internet of Things (IoT) and others. Other services include real-time private and secure video, audio, text and application communication between at least two Smart Device Clients. There are different types of servers that serve these various requests from the Smart Device Clients. In general, these types of servers can be categorized to fall into two groups: a public cloud and a private cloud. Servers in the public cloud, implied by the name "public", provide services that tend to be free with limited functionality or fee-based with more sophisticated services and interact with the public. Examples of the public cloud server include data center, social media services and storage/content provider through the Internet. On the other hand, servers in the private cloud tend to address the private need. The services provided are more private and personal as opposed to those offered by the public cloud.

One example of the application of the private cloud server is a private cloud storage server (PCSS). The PCSS sits within the local area network (LAN) managed by the user. It provides on-line and backup storage for the user either within the LAN or in the wide area network (WAN). The user is able to use a Smart Device Client to access information within the private cloud storage server at anytime from anywhere. The private cloud storage server and the associated Smart Device Client therefore form an example of the Private Cloud Server and Client architecture.

Conventionally, there are many storage server solutions, including network attached storage (NAS), Windows/Mac/Linux server, and direct attached storage (DAS) to fulfill the PCSS requirement. But the challenge for the Smart Device Clients in the field has been how to avoid the cumbersome setup to penetrate the firewall behind the router on the LAN to access the PCSS in a home or office environment. There are at least four kinds of solutions to this challenge.

One solution is to assign a fixed IP address and open certain ports for the router in front of the PCSS, such that the Smart Device Client is able to locate the PCSS from outside the LAN and to authenticate itself, penetrate the firewall and establish a secure communication channel with the PCSS.

A second solution applies when a fixed IP address is not available. The user configures the LAN router of the PCSS and opens certain ports to map to the PCSS. The router is therefore able to be located by the intended Smart Device Client through a dynamic DNS (DDNS) service on the WAN. The Smart Device Client can authenticate itself, penetrate the firewall and establish a secure communication channel with the PCSS.

A third solution is to rely on another routing server in the WAN to conduct the virtual private network (VPN) communication between the Smart Device Client and the PCSS. The VPN communication allows the Smart Device Client to locate the PCSS, authenticate itself, penetrate the firewall and establish a secure communication channel with the PCSS.

A fourth solution is to rely on another routing server in the WAN to conduct the remote desktop protocol (RDP) or virtual network computing (VNC) communication between the Smart Device Client and the PCSS. The RDP/VNC communication allows the Smart Device Client to locate the PCSS, authenticate itself, penetrate the firewall and establish a secure communication channel with the PCSS. Other solutions can be mix- and match of the above mentioned solutions.

In a first scenario, a fixed IP address is required and the router needs to be set up and configured. The down side is that a fixed IP involves more cost and is usually not available in the home and small business environment. The router set up and configuration can be very complicated and are not user friendly with most consumers.

In a second scenario, a DDNS service is required and the router needs yet more complex set up. Again, the DDNS set up involves additional cost and complexity into the system. The router set up and configuration can be very complicated and is not user friendly with most consumers.

In a third and fourth scenarios, an outside routing server or service needs to be established, while a router set up is not necessary. The outside routing server or service controls and handles login/authentication between the Smart Device Client and the server. The private cloud becomes less private and less secure through the public cloud based server or service. If for any reason the server or service is down, the communication and availability of the private cloud storage server will be jeopardized.

All of these scenarios require technical expertise that may be suitable for conventional corporate environment, but these scenarios are not suitable for consumer oriented Smart Device Client centric deployment.

In most conventional systems, an outside or public cloud based routing server is used by the Smart Device Client during access to a Private Cloud Service. Using an outside server creates a number of concerns to the Smart Device Client owner.

First, the sense of trust is always in question, because the outside or public cloud based routing server is a middleman during all communication transactions between the Smart Device Client and the Private Cloud Service. It may hold all user account info, password and their corresponding IP addresses of the Smart Device Client and the Private Cloud Service. The routing server is able to sniff any communication in-between and render it insecure.

Second, being an outside and public cloud based routing server, the business model of the owner of server may not always be in-line or in-sync with the Smart Device Client owner. If the routing server is out of service due to any business reason, there is no remedy or option of replacement to restore the service. The routing server potentially poses a tremendous business risk to the user as the vital link in the communication can be broken without recourse.

Conventionally, in the case of communication between two Smart Device Clients, both parties need to sign in to a public cloud based server in order to conduct real-time video, audio, text or application communication. The privacy and security are easily compromised due to the fact that the communication has to go through a public cloud based server, as outlined above.

Accordingly, what is needed is a system and method that addresses the above identified issues. The present invention addresses such a need.

SUMMARY OF THE INVENTION

A method for use with a public cloud network is disclosed. The method includes setting up at least one private cloud routing server (PCRS) and at least one smart device client on the side of the PCRS in a client server relationship. It also includes setting up at least another smart device client on the side of the PCCBS in a client server relationship with the at least one private cloud call-back server (PCCBS). The private cloud call-back server acts as a middleman to relay communication between the smart device client on the side of the PCCBS and the private cloud routing server. The PCCBS will call back the private cloud routing server on demand based on the smart device client request. The at least one private cloud call-back server includes a first message box associated therewith. The first message box is located inside the private cloud call-back server (PCCBS) on a public cloud network. The at least one smart client includes a second message box associated therewith. The second message box is located inside the private cloud call-back server (PCCBS) on the public cloud network. The at least one private cloud call-back server is located on a public cloud network. The third message box associated with the PCRS is located inside the private cloud call-back server (PCCBS) on the public cloud network. The method also includes passing a session based message between the first message box and the second message box; and also passing a session based message between the second message box and the third message box in a secure manner.

The secure session based connection mechanism between the private cloud routing server, the private cloud call-back server, and the at least one smart device client comprises initialization and provisioning of the PCCBS, creation of a PCCBS Client, viewing the PCCBS Client, editing a PCCBS peer-to-peer password and status by an administrator, changing the PCCBS peer-to-peer password by the at least one smart device client, resetting the PCCBS peer-to-peer password and status by an administrator from the PCCBS LAN and connecting to the PCCBS by the at least one smart device client. The session based message is authenticated by the private cloud routing server, the private cloud call-back server, and the at least one smart device client. The smart device client, the private cloud call-back server, and the private cloud routing server can communicate with each other after the session based message is authenticated.

At least one private network service is then securely accessible by the smart device client through the public cloud network based upon the authenticated session based message. The method also includes setting up the at least another smart device client in a client server relationship with the at least one private cloud routing server and the at least one private cloud call-back server. The at least two smart device clients and the private cloud routing server can communicate with each other after the session based message is authenticated. The at least two smart device clients can privately and securely communicate with each other through the public cloud network. By employing the private cloud call-back server between the smart device client and the private cloud routing server, it is more effective to traverse through all types of the NAT router in the LAN environments without going through hole-punching mechanism as is in the prior art. The added communication latency through the private cloud call-back server is greatly improved to a minimal, due to the advent of 5G/6G and Wi-Fi 6 network. For the purpose of accessing oner smart device client, or IoT device at home from another smart device client anywhere in the world, the present invention maintains the benefits of ease of deployment, great privacy and security, full compatibility and high performance.

DETAILED DESCRIPTION

Figure 1:
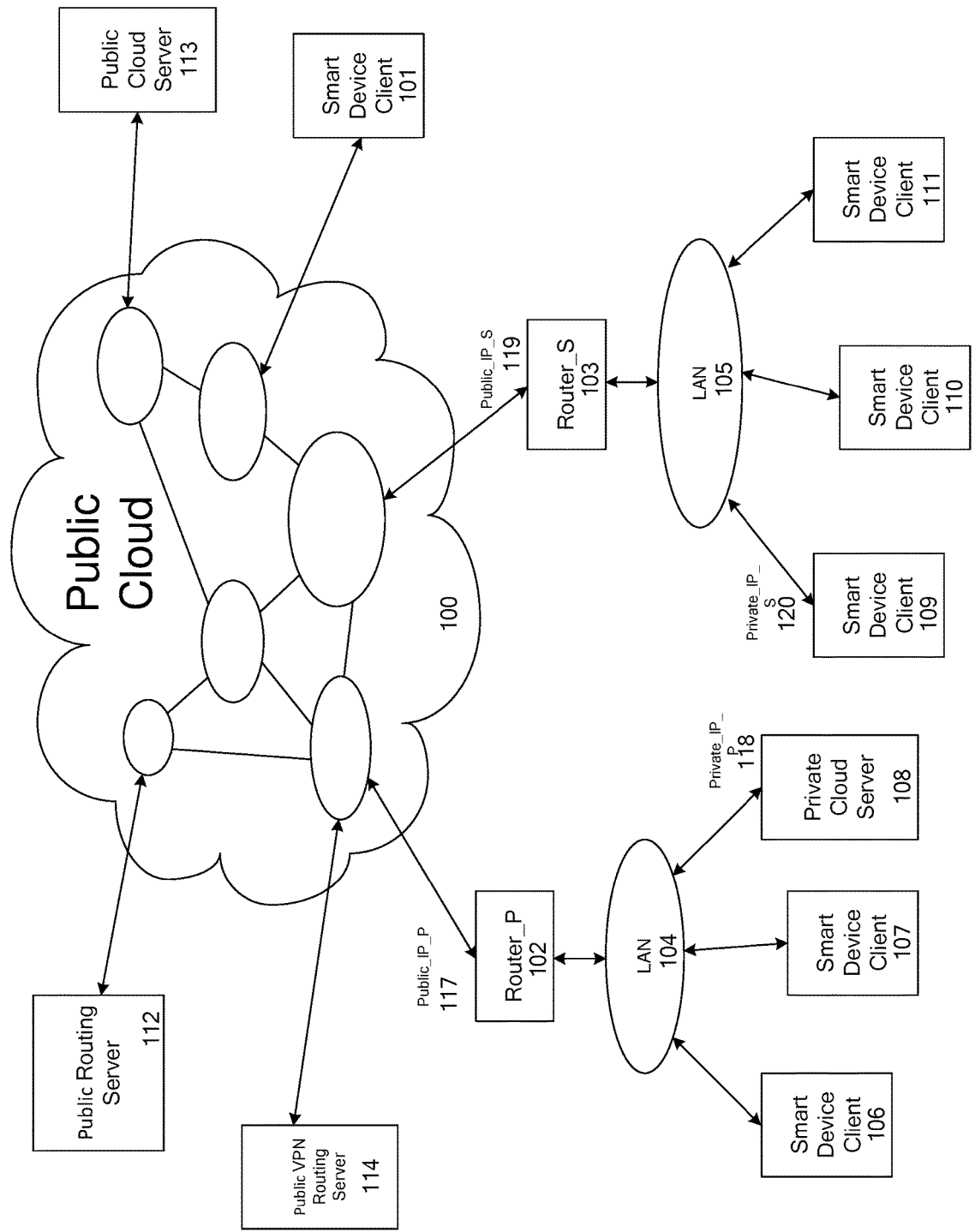
FIG. 1 is a block diagram of a conventional Cloud Network Infrastructure.

The present invention relates generally to networking and more particularly to the use of private cloud networks. The following description is presented to enable one of ordinary skill in the art to make and use the invention and is provided in the context of a patent application and its requirements. Various modifications to the embodiments and the generic principles and features described herein will be readily apparent to those skilled in the art. Thus, the present invention is not intended to be limited to the embodiments shown, but is to be accorded the widest scope consistent with the principles and features described herein.

The term "Client" is interchangeable with "Smart Device Client" throughout discussion in the context. The term "router" is in general interchangeable with "gateway", "access point" and/or "NAT" (network address translation) in the discussion.

A system and method in accordance with the present invention addresses the following challenges in a consumer oriented environment for a Smart Device Client in a WAN to be able to obtain services from a Private Cloud Storage Server (PCSS) or any Private Cloud Server (PCS):

1. Access the Private Cloud Server (PCS) at anytime from anywhere.
2. Access the PCS behind the firewall with fixed or dynamic IP address.
3. Require no public cloud based routing server in the WAN.
4. Require no additional router setup in the LAN.
5. Authenticate with the PCS.
6. Establish a secure communication channel with the PCS.

If such challenges can be met and resolved, the deployment of the Private Cloud Server or service will increase exponentially, due to plug and play simplicity and availability. The technical and business concern will also be removed by not utilizing a public cloud based routing server. The Private Cloud Server being utilized for storage, remote desktop service and Internet of Things (IoT) becomes very affordable and ubiquitous in the private cloud infrastructure.

In the private cloud environment, if there are more than one private cloud servers or services co-existing at the same time, it is advantageous to separate out the functions of Private Cloud Server into two functional blocks including Private Cloud Routing Service (PRS) and Private Network Service (PNS). The PNS is designed to be managed and accessed on the private network environment, be it wired or wireless, by the Smart Device Client. Examples of a PNS include application program server to provide remote desktop protocol (RDP), VNC, office tools, media player, and other user specific applications. The PNS may also function as a storage server that contains multiple terabytes of storage serving the private cloud. Functions of the PRS of the multiple Private Cloud Routing Servers can then be aggregated together into just one Private Cloud Routing Server (PCRS). The PCRS can generally be referred to as a Private Cloud Router.

A system and method in accordance with the present invention addresses the following challenges in the consumer oriented environment for utilizing the Smart Device Client in the WAN to be able to manage and access Private Network Service (PNS) from a Private Cloud Routing Server (PCRS):

1. Access the Private Cloud Routing Server (PCRS) at anytime from anywhere.
2. Access the PCRS behind the firewall with fixed or dynamic IP address.
3. Require no outside or public cloud based routing server in the WAN.
4. Require no additional router setup in the LAN.
5. Authenticate with the PCRS.
6. Establish a secure communication channel with the PNS to manage and access.

If the PCRS can fulfill the above mentioned challenges, heterogeneous Private Cloud Servers from different manufacturers and vendors can then be broken down into simpler Private Network Services and remove the complexity of private cloud setup, configuration and access The purpose of a system and method in accordance with the invention is to provide a Private Cloud Routing Server (PCRS), Private Network Service and Client architecture without utilizing a routing server. The system and method in accordance with the present invention addresses the above identified challenges that to allow a Client to be able to access the Private Network Service (PNS) from anywhere at anytime. The system and method also accesses the PNS behind a firewall with fixed or dynamic IP, requires no additional router setup and no public cloud based routing server in the WAN, to authenticate with the PCRS, and to establish a secure communication channel directly with the PNS.

As shown in FIG. 1, a cloud network infrastructure includes a public cloud 100, a public cloud server 113, a public routing server 112, a VPN routing server 114, a Smart Device Client 101 in the WAN, a Router_P 102 and a Router_S 103. The Router_S 103 connects between a LAN 105 and the Internet in public cloud 100. The Router_P 102 connects between a LAN 104 and the Internet in public cloud 100. Behind the LAN 104, there are Smart Device Clients 106, 107 and a Private Cloud Server (PCS) 108. Behind the LAN 105, there are Smart Device Clients 109, 110 and 111. The Smart Device Client can be a PC, notebook, tablet, eBook reader, GPS, smart TV, set top box, MP3 player, or any networkable embedded device.

They are denoted in the Cloud Network Infrastructure as 101, 106, 107, 109, 110, and 111. Any one of the Smart Device Clients above is interchangeable in the context and discussion. The focus on this discussion is the Smart Device Client 109, as the representative in this context.

Physically, there are three scenarios that a Smart Device Client 101, 107 or 109 can connect to the Private Cloud Server 108. First, a Smart Device Client 107 determines whether the target is in the locally accessible LAN 104 and decides to connect to the Private Cloud Server 108 directly. Second, the Smart Device Client 101 determines the target is not in the locally accessible LAN 104 and decides to connect through the WAN to the public cloud 100. The WAN locates the Router_P 102 and LAN 104, and then connects to the Private Cloud Server 108. Third, the Smart Device Client 109 determines the target is not in the locally accessible LAN 105 and decides to passes through LAN 105, Router_S 103, and connects to the public cloud 100 in the WAN.

The Smart Device Client 109 then locates Router_P 102, LAN 104 and connects to the Private Cloud Server 108. The first and the second scenario are two special cases and derivatives of the third scenario. Therefore, it is beneficial to focus on the third scenario that is broader in scope and complexity.

The routing server message box (not shown) or client message box 215, can be hosted inside an email server, text message server, web server, or any kind of server that can host secure message for information exchange between the Private Cloud Routing Server 208, and the Private Cloud Call-Back Server 216, as a server, and the Smart Device Client 206, 207, 209, 210, 211, 201, 221, as a client. The Call-Back Server Message Box (not shown) or Client Message Box message_box_S 215, is accessible and under the secure and private control of either Private Cloud Routing Server 208, and the Private Cloud Call-Back Server 216, as a server, or the Smart Device Client 206, 207, 209, 210, 211, 201, 221, as a client. The security and business model of the message box is well understood and expected in the industry by the user. For any reason either message box is down, it can be replaced or redeployed immediately without jeopardizing the communication between the server and the client in the private cloud infrastructure.

Figure 2:
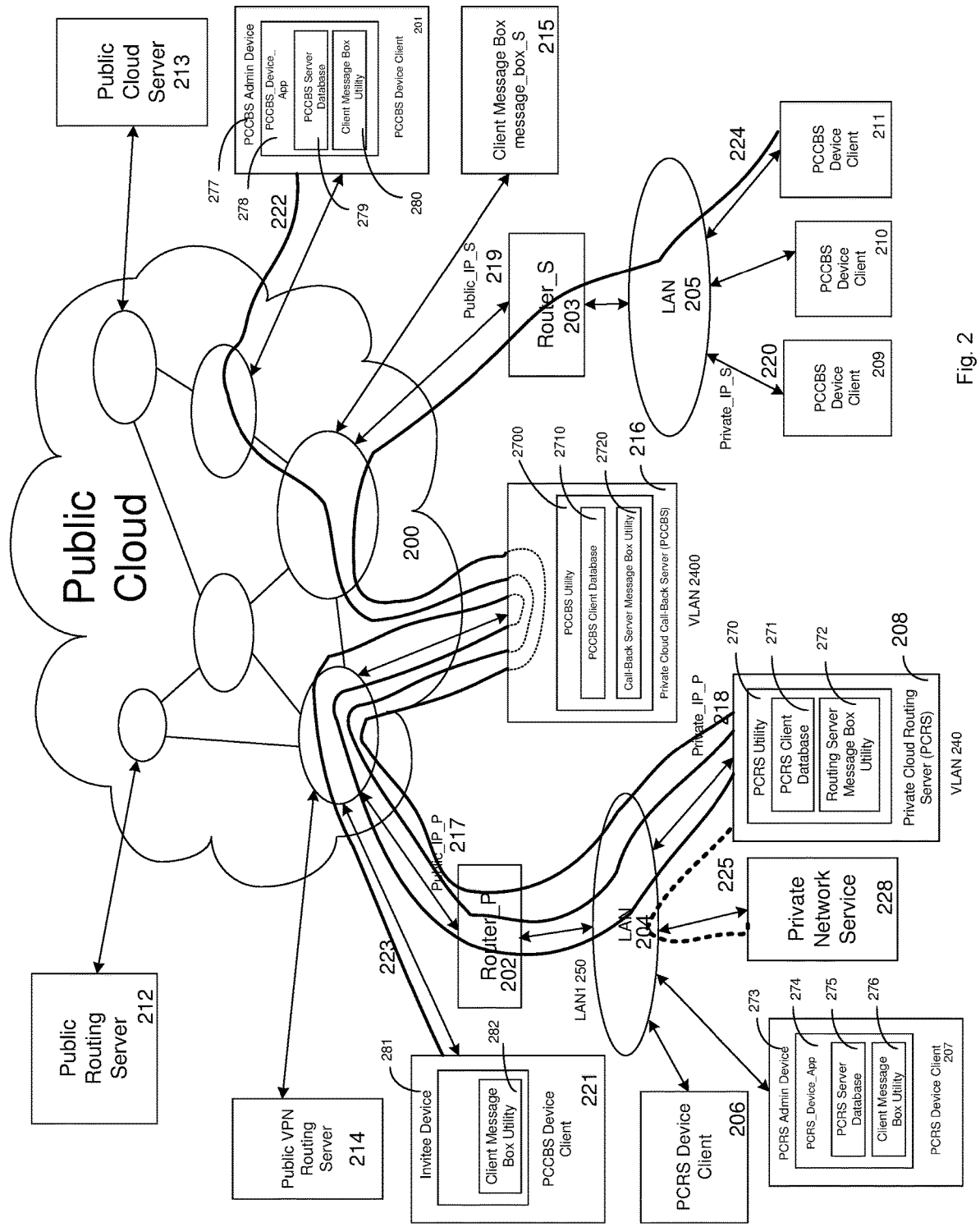
FIG. 2 is a block diagram of a first embodiment of a Cloud Network. Infrastructure for the connection mechanism between the Private Cloud Routing Server, the Private Cloud Call-Back Server, and the Smart Device Client in accordance with the present invention.

FIG. 2 shows a block diagram of a first embodiment of a Cloud Network Infrastructure for a secure connection mechanism between the Private Cloud Routing Server, the Private Cloud Call-Back Server, and the Smart Device Client for the exploring and accessing of Private Network Service across the public cloud. The Smart Device Client 201, 211 and 221, through the communication path 222, 224 and 223 respectively are able to locate the Private Cloud Routing Server 208 with the mechanism disclosed in FIG. 5 through 15. The Private Cloud Routing Server 208 and the Private Cloud Routing Server 216 then builds a virtual LAN, VLAN, 240 and a virtual LAN, VLAN, 2400 allowing the authorized Smart Device Clients 201, 211 and 221 to join in as members of the virtual LAN, VLAN, 240 and the virtual LAN, VLAN, 2400. The Smart Device Client 201 through the installed program can initiate a private and secure communication as a host. The Smart Device Client 211 or 221 through the installed program can receive the communication invitation as a guest and join the private and secure communication session with the host Smart Device Client 201.

As shown in FIG. 2, when a Smart Device Client 201 wants to start a communication session as a host, the program installed on the host Smart Device Client first locates and logs-in to the Private Cloud Call-Back Server (PCCBS) 216 through the communication path 222. After the Private Cloud Call-Back Server 216 locating the Private Cloud Routing Server 208, it joins the virtual LAN, VLAN, 240. The Smart Device Client commits to join chat communication as a host 201. The program allows the Smart Device Client 201 to create and host a communication session. The program broadcasts the host session to invite communication guest 221. Afterwards, the program starts scanning for recognizable guest 221. Once the guest is authenticated, the Smart Device Client 201 can start private and secure communication as a host with the authenticated guest Smart Device Client 221. The private and secure communication includes video, audio, text or application. The application can be a program, utility, operation or remote desktop that is recognizable by both host and guest.

If the Smart Device Client 211 or 221 wants to join a communication session as a guest, the program installed on the guest Smart Device Client first locates and logs-in to the Private Cloud Call-Back Server (PCCBS) 216 through the communication path 224 or 223 respectively. After the Private Cloud Call-Back Server 216 locating the Private Cloud Routing Server 208, it joins the virtual LAN, VLAN, 240 under the server. The Smart Device Client commits to join chat communication as a client. The program waits for a communication invitation. Once it receives a communication invitation, the Smart Device Client 211 or 221 may join a communication session as a guest. The program then starts scanning for recognizable host. Upon identifying the host, the program goes through the communication log-in authentication prompted by the host. Once authenticated, the Smart Device Client can join the communication session. The Smart Device Client 211, 221 starts private and secure communication as a guest with the host Smart Device Client 201. The private and secure communication includes video, audio, text or application. The application can be a program, utility, operation or remote desktop that is recognizable by both host and guest.

In another embodiment of the present invention, the Smart Device Client can establish a private and secure communication with any service that is reachable on the physical LAN, LAN1 250 or virtual LAN, VLAN, 240 and virtual LAN, VLAN, 2400 under the Private Cloud Routing Server and the Private Cloud Call-Back Server. As shown in FIG. 2, once the Smart Device Client 201, 211 or 221 locates and logs-in to the Private Cloud Call-Back Server 216, it may access any Private Network Service 228 that is reachable on the physical LAN, LAN1 250, LAN2 260, and virtual LAN, VLAN, 240 and virtual LAN, VLAN, 2400 under the Private Cloud Routing Server and the Private Cloud Call-Back Server through a secure communication path 225. The Private Network Service includes audio, video contents, live or archived information, and execution of applications, social media, messaging, email, storage, backup, calendar, contact, synchronization, sharing, remote desktop, Internet of Things (IoT) and others.

In an embodiment, the communication path 225 between the Private Cloud Routing Server (PCRS), the Private Cloud Call-Back Server (PCCBS) and the Smart Device Client may include several sets of commands:
1. Initialize and Provision a PCRS (by an Admin from a PCRS LAN)
2. Initialize and Provision a PCCBS (by an Admin from WAN)
3. Create a PCRS Client (by the Admin from a PCRS LAN)
4. Register to a PCCBS (by a PCCBS Client from WAN)
5. Connect to a PCCBS (by a PCCBS Client from WAN)
6. View a PCCBS Client (by the administrator from WAN)
7. Reset a PCCBS peer-to-peer password and status (by the administrator from the WAN)
8. Change the PCCBS peer-to-peer password (by the PCCBS Client through a virtual private network (VPN) from WAN)

A number of entities are introduced to allow for the secure communication path 225 including but not limited to: Administrator, Admin Device, PCRS Utility, PCCBS Utility, PCRS Device Client, PCCBS Device Client, Invitee and Invitee Device. These entities are defined herein below. Utility is a utility running in the Private Cloud Routing Server. Admin Device is a device that administrator uses to configure the PCRS. PCRS Device Client is a device that an Invitee uses to communicate with the PCRS. Invitee is a physical party invited by the Admin to access the PCRS service and resources. Invitee Device is a Smart Device Client that the Invitee uses to communicate with the PCRS.

A number of terms are introduced including Access_Code, Code_Expiration, Address_Invitee, Address_PCRS_Client, Hash_Password_PCRS_P2P, Password_PCRS_P2P_Expiration, and Status in PCRS Client database. These terms are defined hereinbelow. Access_Code is an invitee access code sent by Admin through PCRS via message box 216. Code_Expiration is an expiration date/time of the access code for security purpose. Address_Invitee is a message box address of the invitee. Address_PCRS_Client is a message box address of the PCRS Client which may be different from the invitee. Hash_Password_PCRS_P2P is a hashed password for the PCRS peer-to-peer communication. It is stored in the PCRS Client database. The actual password Password_PCRS_P2P is never stored in PCRS for security consideration. The Password_PCRS_P2P_Expiration is the expiration of the Password_PCRS_P2P. The Status is the Active, Inactive or Deleted status of the PCRS_Client record in the PCRS Client database.

Other terms not associated with the PCRS client database are: Address_PCRS, Password_PCRS, Password_PCRS_Client and Virtual LAN subnet. They are defined herein below. Address_PCRS and Password_PCRS are used to configure the message box account of the PCRS. They are used only once during initialization and provisioning of PCRS and is never stored for security purpose. Address_PCRS_Client and Password_PCRS_Client are used to configure the message box account of the PCRS Client. They are used only once during creation of PCRS Client in the database. While the Address_PCRS_Client is stored in the database, the Password_PCRS_Client is never stored for security purpose. Virtual LAN subnet is the subnet setting of the VPN (virtual private network). It is configurable and changeable to specify the private subnet for security purpose.

As shown in FIG. 2, the Private Cloud Routing Server (PCRS) 208 contains a PCRS_Utility 270, which in turn contains a PCRS Client database 271 and a Routing Server Message Box utility 272. The PCRS Client database 271 contains the registered list of PCRS clients. The message box utility 272 is able to communicate with the Call-Back Server Message Box (not shown).

The Admin Device 273 is itself a Smart Device Client 207. It contains an application utility PCRS_App 274, which in turn contains a PCRS Server database 275 and a Client Message Box utility 276. The PCRS Server database 275 contains the registered list of PCRS servers. The message box utility 276 is able to communicate with the Client Message Box 215.

The PCCBS Device Client 201 is itself a Smart Device Client. It contains an application utility PCCBS_App 278, which in turn contains a PCCBS Server database 279 and a Client Message Box utility 280. The PCCBS Server database 279 contains the registered list of PCCBS servers. The message box utility 280 is able to communicate with the Client Message Box 215.

Figure 5:
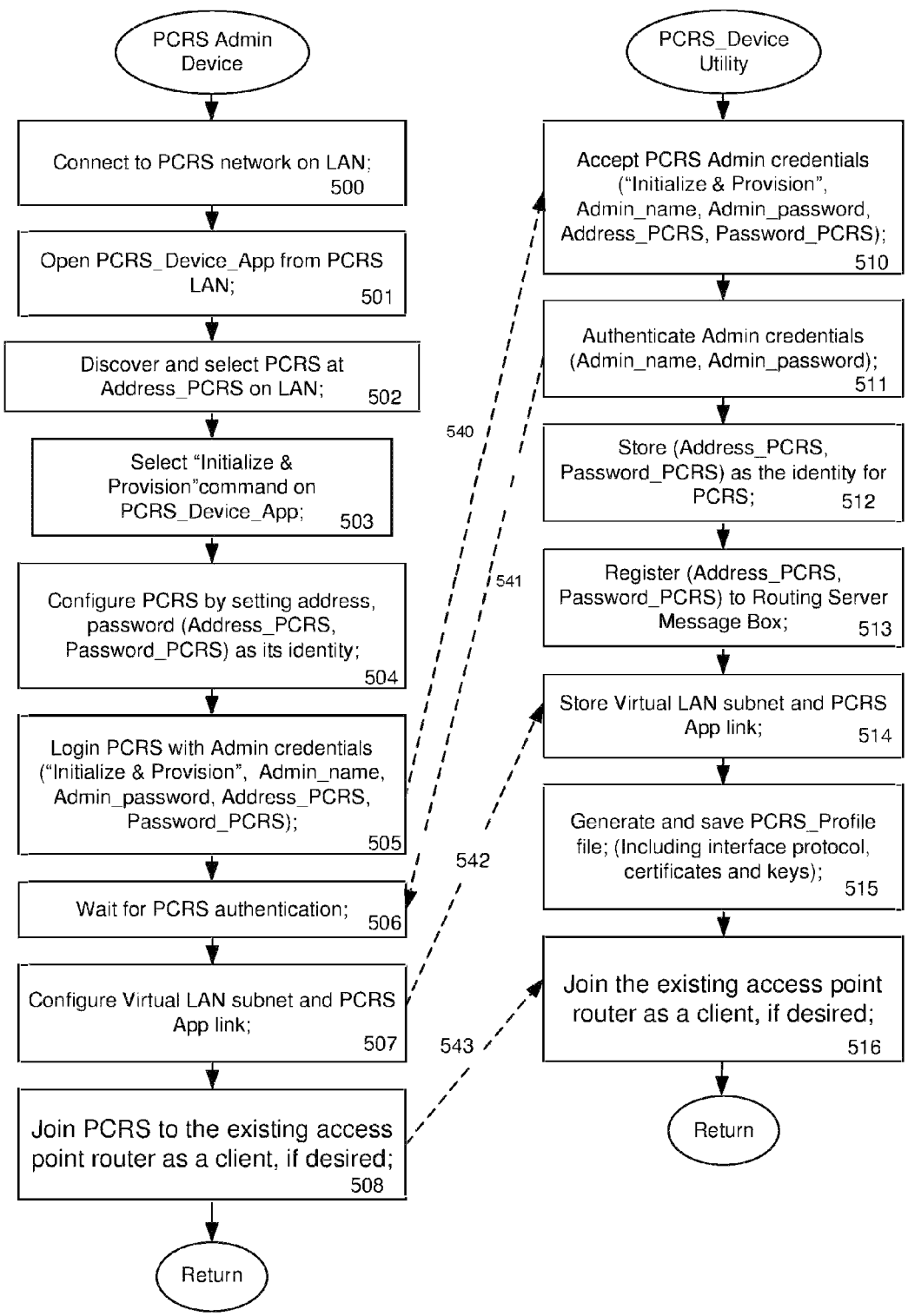
FIG. 5 shows the communication flow of Initializing and Provisioning of the Private Cloud Routing Server by PCRS Admin in accordance with the present invention.

The Invitee Device 281 is itself a Smart Device Client 221. It contains a Client Message Box utility 282. The message box utility 282 is able to communicate with the Client Message Box 215. The administrator uses the utility PCRS_App 274 to initialize and provision the PCRS 208, as shown in FIG. 5, from Admin Device 207. The Admin Device 207 is located on the same physical LAN 204 as that of PCRS 208, in order to conduct configuration for security purpose to avoid hacking exposure on Internet or WAN. The administrator first configures the PCRS Routing server message box credentials by setting its account name and password. The PCRS Routing server message box credentials are then sent to PCRS Utility 270 in the PCRS 208.

Figure 6:
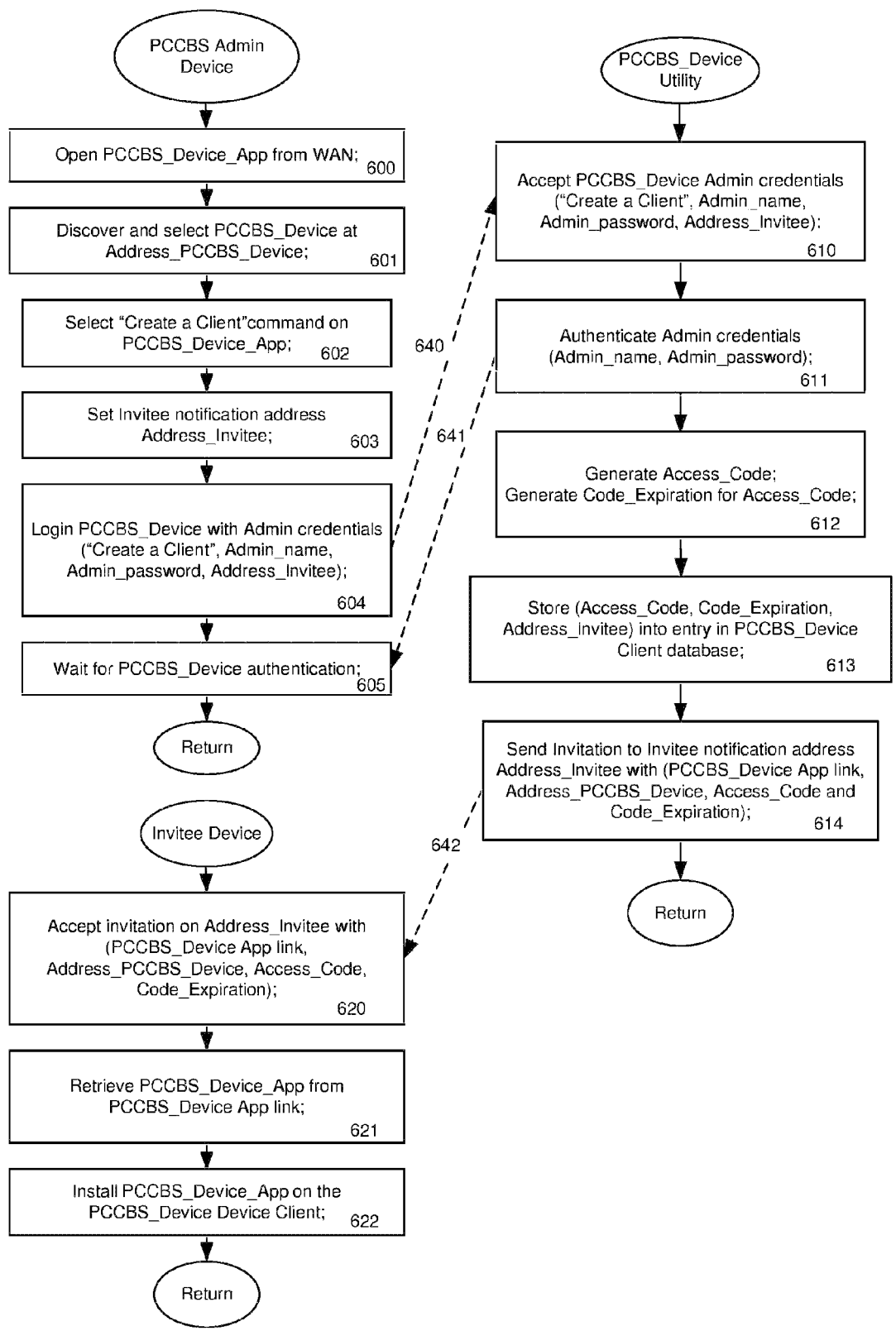
FIG. 6 shows the communication flow of creating a client for the Private Cloud Call-Back Server by the PCCBS Admin in accordance with the present invention.

The Private Cloud Call-Back Server (PCCBS) 216 contains a PCCBS_Utility 2700, which in turn contains a PCCBS Client database 2710 and a Routing Server Message Box utility 2720. The PCCBS Client database 2710 contains the registered list of PCCBS clients. The message box utility 2720 is able to communicate with the Call-Back Server Message Box (not shown). The utility PCCBS_Device_App 278 is also used by the administrator 277 to create a PCCBS Client account, as shown in FIG. 6. The administrator 277, which is itself a PCCBS device client 201, then sets the Invitee notification address in PCCBS_Device_App 605. It then asks the PCCBS to send connection invitation through the Call-Back Server Message Box utility 2720, to Call-Back Server Message Box (not shown), through Client Message Box 215, and eventually to the Invitee Device 281, and it's Client Message Box Utility 282. Note that Call-Back Server Message Box (not shown) and Client Message Box 215 are both hosted inside message box servers, such as email servers, web servers and message servers. Both Call-Back Server Message Box and Client Message Box can logically be the same or different. After the invitee receives the invitation 620, it retrieves PCCBS_Device_App from the PCCBS App link 621 and installs PCCBS_App on a desired PCCBS Device Client 201. The Invitee device 281 is not necessary at the same physical device as the PCCBS Device Client 201. The administrator has to know the invitee's message box address Address_Invitee 605, in order to send out the invitation.

Figure 7:
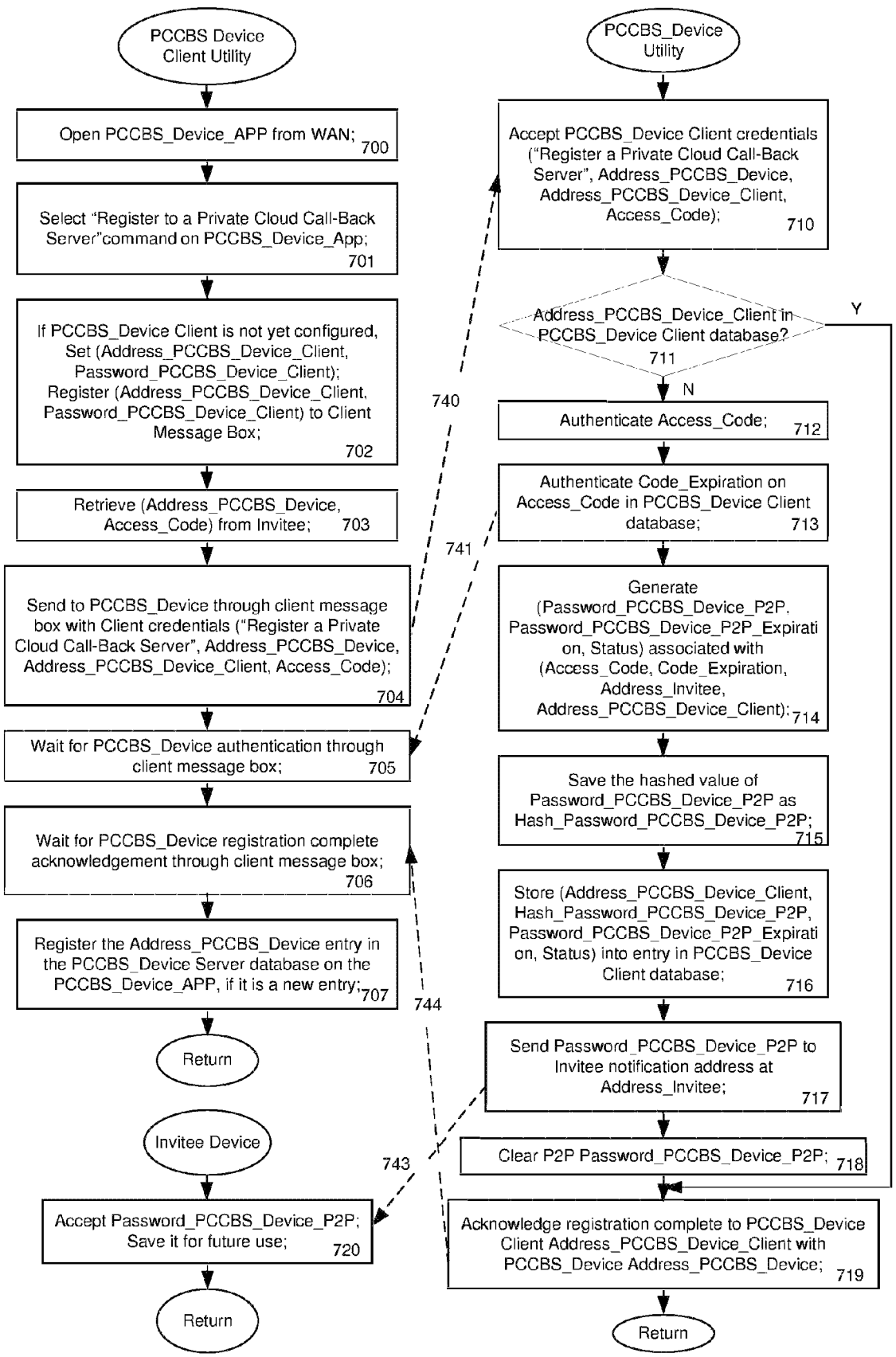
FIG. 7 shows the communication flow of Registering to a Private Cloud Call-Back Server by a PCCBS Device Client in accordance with the present invention.

On the desired PCCBS Device Client 201, the invitee launches the PCCBS_Device_App 700 and proceeds to register to a PCCBS 701 as shown in FIG. 7. The invitee's role at this point changes to a PCCBS Client on the PCCBS Device Client 201. The PCCBS Client then configures its Client Message Box credentials by setting its account name and password and registers the credentials to the Client Message Box 215. The previously received Address_PCCBS and Access_Code are then retrieved from the Invitee Device 281 and sent along with the Client Message account Address_PCCBS_Client to PCCBS 710 via 740. After authentication by the PCCBS Utility 2700 inside PCCBS 216, a set of peer-to-peer connection credentials including Password_PCCBS_P2P are generated 714. The actual Password is sent to the Invitee Device 281 through the Client Message Box 215. The hashed password along with other client credentials are stored in the PCCBS Client database. The actual client P2P password is never stored in PCCBS 216 for security reasons. However its hashed value is stored instead for comparison in authentication 716. As soon as the PCCBS Device Client 201 receives acknowledgement from the PCCBS 216 for registration 707, it records the PCCBS identity Address_PCCBS in the PCCBS server database 279 in the PCCBS_Device_App 278.

Figure 9:
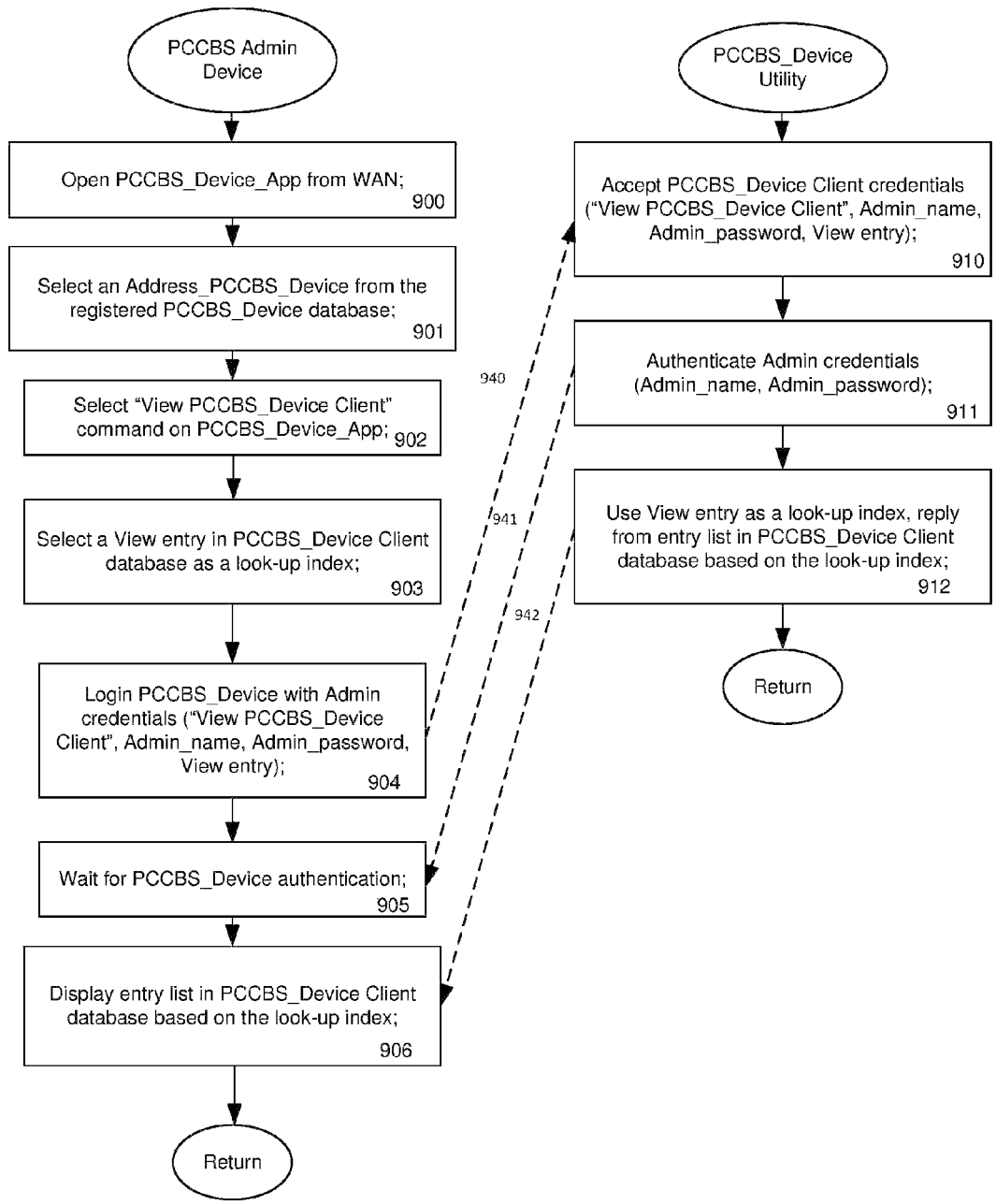
FIG. 9 shows the communication flow of Viewing Client of the Private Cloud Routing Server by Admin in accordance with the present invention.
Figure 10:
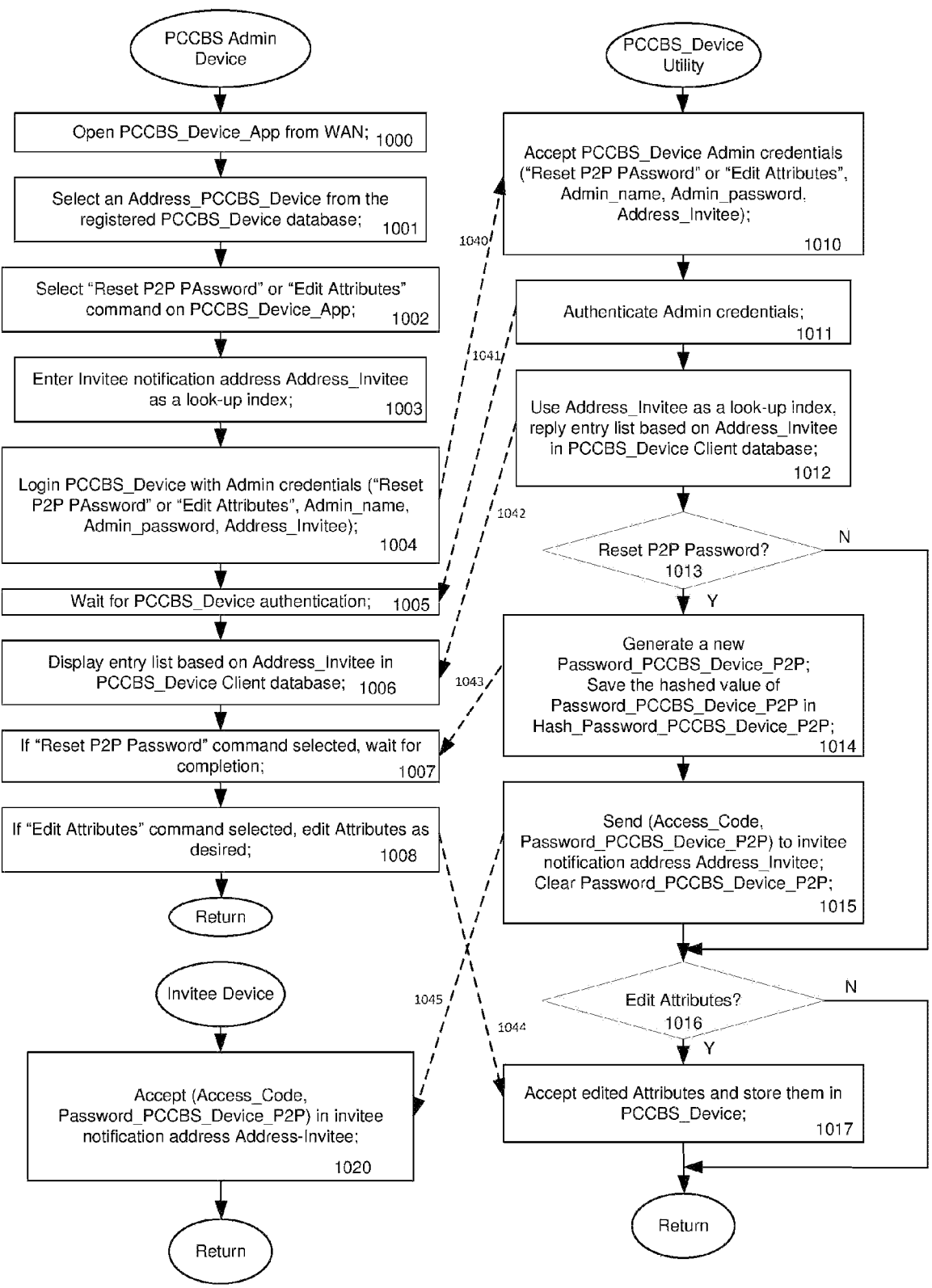
FIG. 10 shows the communication flow of Resetting peer-to-peer password and editing attributes of a PCCBS Device Client by Admin in accordance with the present invention.

There are a total of four commands provided in the PCCBS_Device_App for the Admin Device: "Initialize and Provision", "Create a Client", "View PCCBS Client" and "Reset PCCBS P2P Password/Edit Attributes", as shown in FIGS. 6, 9 and 10. Whenever the Admin operation is involved, only the access to the PCCBS from the PCCBS virtual LAN, VLAN, (be it physical or virtual) is allowed for security reasons. Due to the limited access, network traffic sniffing and hacking is avoided by conducting setting and configuration of PCCBS solely on the PCCBS virtual LAN, VLAN.

Figure 8:
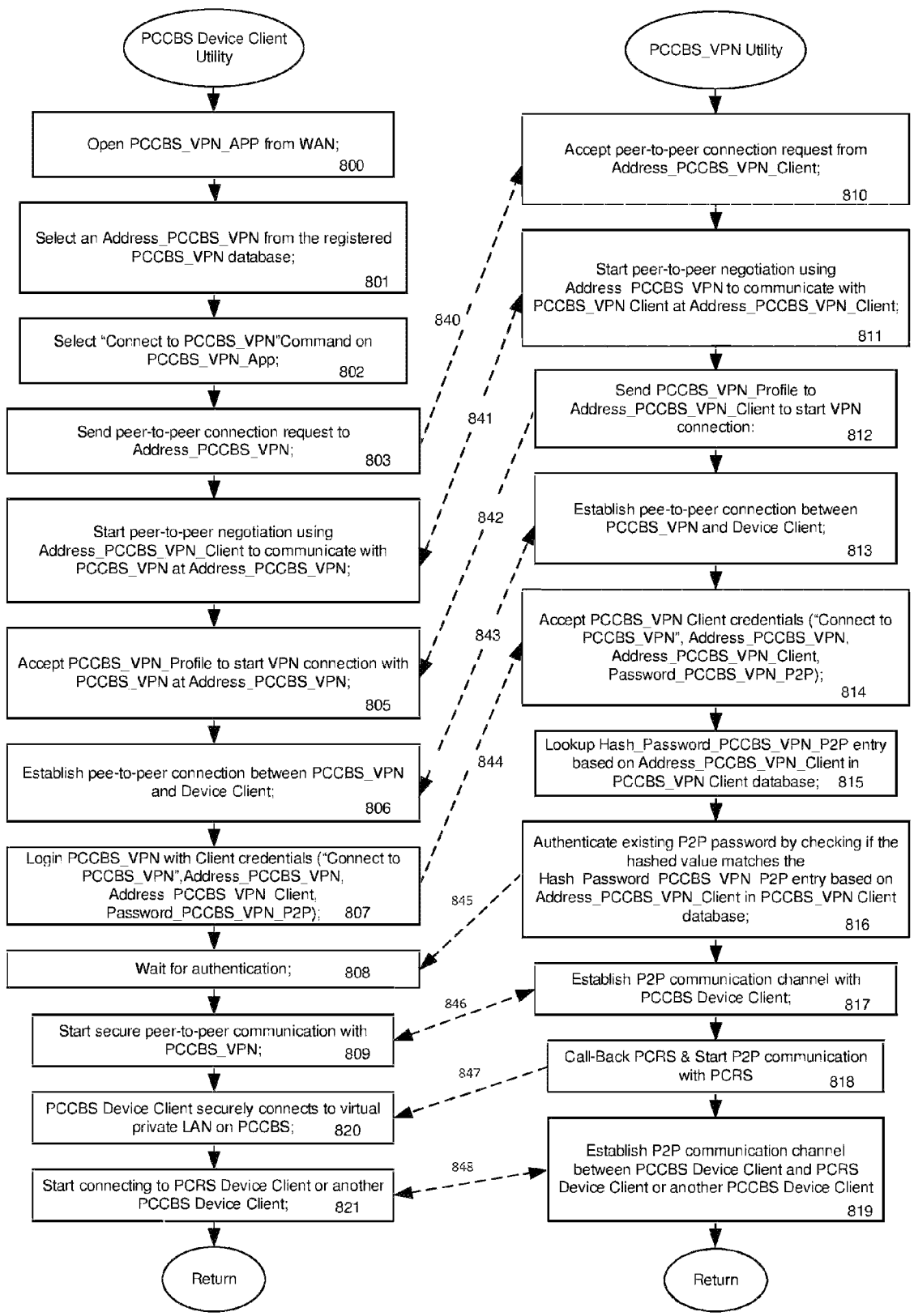
FIG. 8 shows the communication flow of Connection from the PCCBS Device Client to the Private Cloud Call-Back Server by a PCCBS Device Client in accordance with the present invention.
Figure 11:
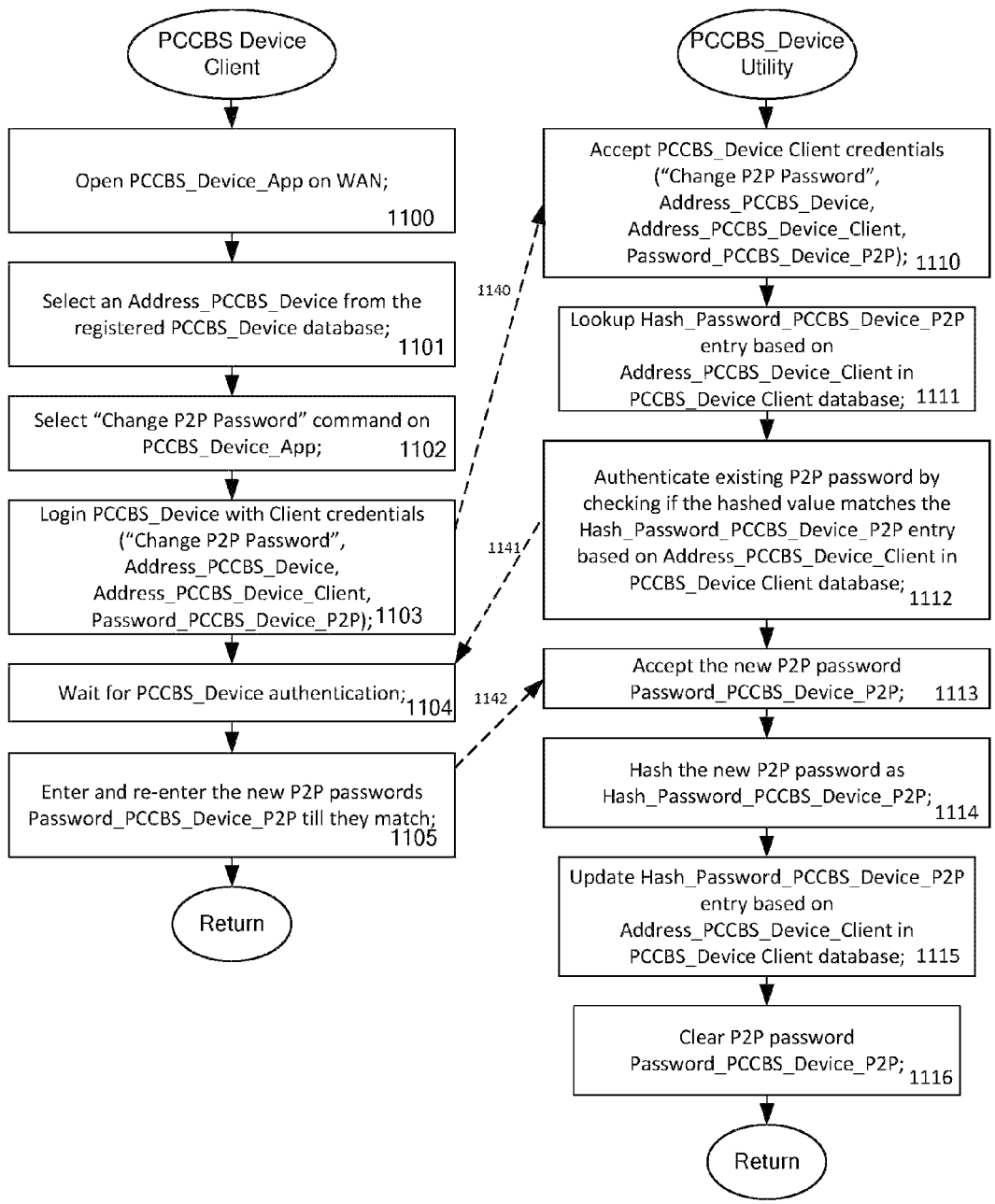
FIG. 11 shows the communication flow of changing peer-to-peer password of a PCCBS Device Client by a PCCBS Device Client in accordance with the present invention.

There are three commands provided in the PCCBS_Device_App for the PCCBS Device Client: "Register to a PCCBS", "Change P2P Password" and "Connect to PCCBS", as shown in FIGS. 7, 8 and 11. In the case of "Register to a PCCBS" command, the PCCBS Device Client is able to run PCCBS_Device_App and connect to the PCCBS Utility from either WAN or PCCBS virtual LAN, VLAN. The PCCBS Device Client is able to run PCCBS_Device_App and connect to the PCCBS Utility from either WAN or PCCBS virtual LAN, VLAN, because the communication exchange between the PCCBS Device Client and the PCCBS Utility for registration to PCCBS is through Client Message Box 215 and Call-Back Server Message Box (not shown), as shown in FIG. 7. In the case of "Change P2P Password" command, the PCCBS Device Client has to run PCCBS_Device_App on PCCBS virtual LAN, VLAN, after secure VPN connection from WAN, because the P2P Password can only be reset on the PCCBS virtual LAN, VLAN, for security reason. The only way for the PCCBS Device Client to connect to PCCBS virtual LAN, VLAN, is through a secure VPN connection to the virtual LAN of PCCBS, as shown in FIG. 11. In the case of "Connect to PCCBS" command, the PCCBS Device Client has yet to connect to the PCCBS from anywhere either on WAN or PCCBS virtual LAN, VLAN. The consequence of this command on the PCCBS_App is the prerequisite for any secure and private connection between the PCCBS Device Client and the PCCBS, as is shown in FIG. 8. The private cloud call-back server 216 acts as a middleman to relay communication between the smart device client 221, 201, 211 and the private cloud routing server 218. It will call back the private cloud routing server on demand based on the smart device client request.

Figure 3:
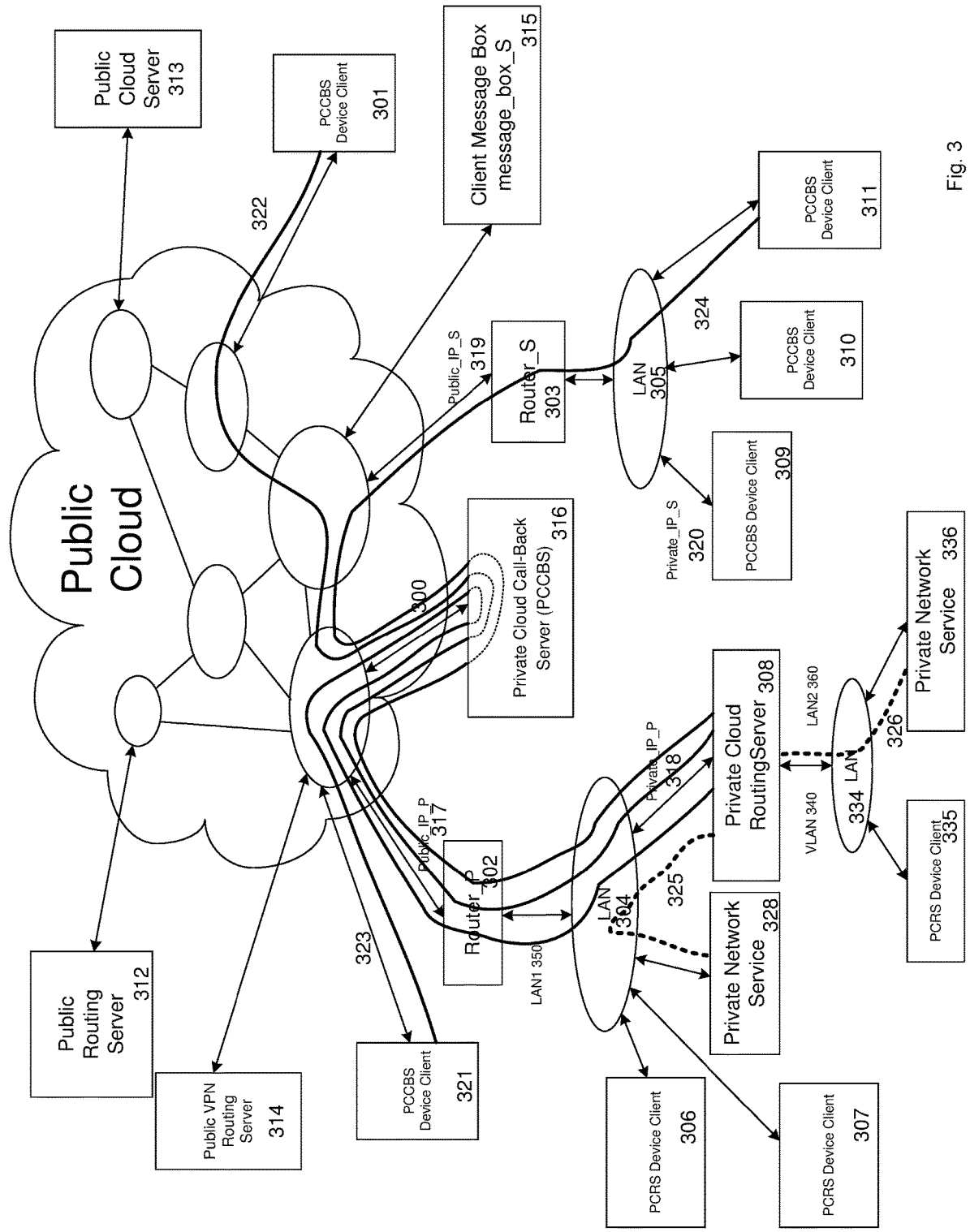
FIG. 3 is a block diagram of a second embodiment of a Cloud Network Infrastructure for the connection mechanism between the Private Cloud Routing Server, the Private Cloud Call-Back Server, and the Smart Device Client in accordance with the present invention.

FIG. 3 shows a block diagram of a second embodiment of the invention. The Private Cloud Routing Server 308 connects to the LAN of a Router_P 302, in a manner similar to the way Private Cloud Routing Server 208 connects to the LAN of a Router_P 202 in FIG. 2. The PCRS 308 also has a physical LAN LAN2 360 connecting downstream. A Private Network Service 336 and a Smart Device Client 335 are connected downstream. The Private Network Service 336 is accessible through the communication path 326, connecting through LAN 334 to Private Cloud Routing Server 308. As long as the virtual LAN 340, the physical LAN LAN1 350, and physical LAN LAN2 360 are all explorable and accessible by the Smart Device Clients 311, 310, 309, 301, 321, 306, and 335 across the cloud through the Private Cloud Call-Back Server 316, and the Private Cloud Routing Server 308, all Private Network Service 328, 336, and Smart Device Client 306, 335 become accessible.

Figure 4:
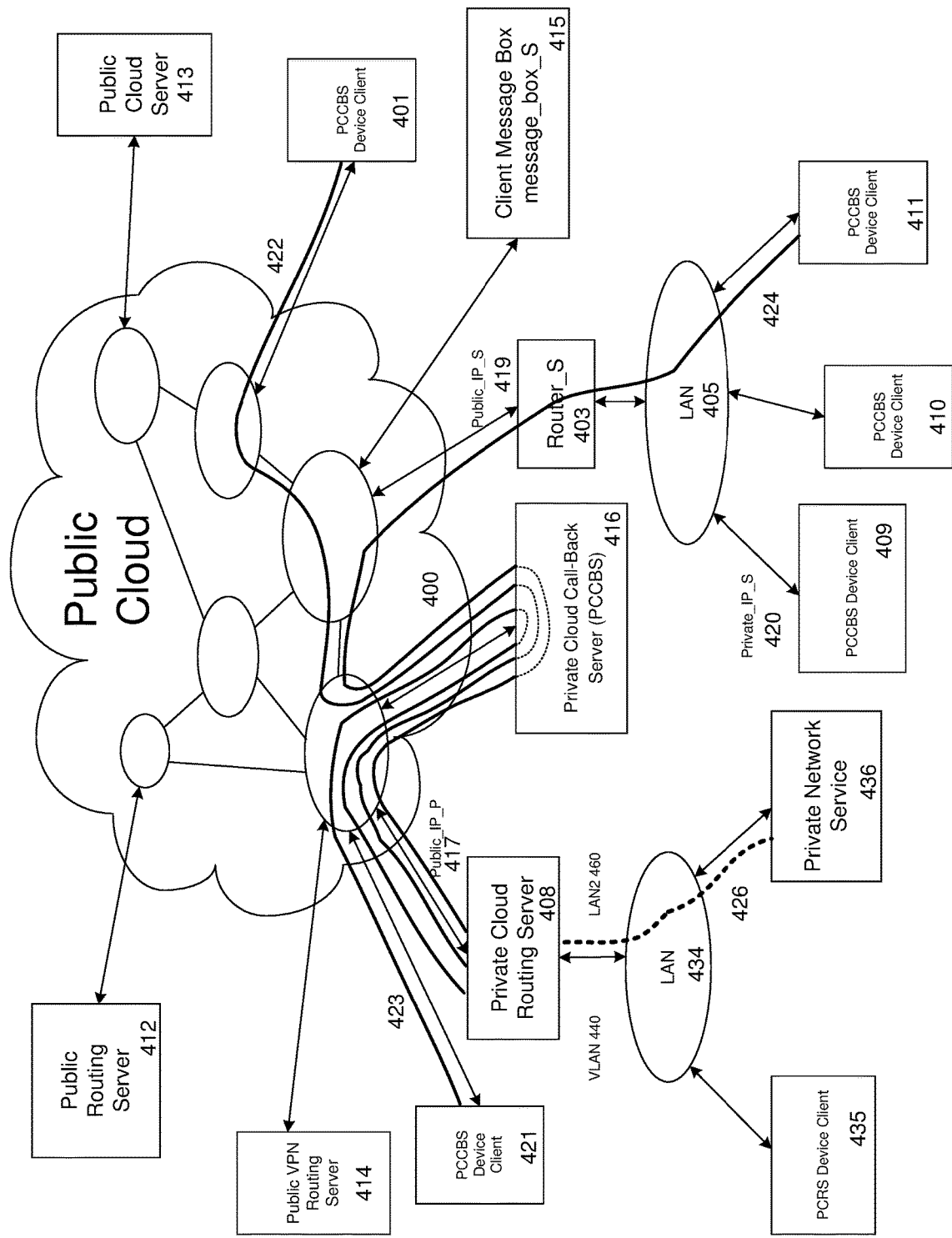
FIG. 4 is a block diagram of a third embodiment of a Cloud Network Infrastructure for the connection mechanism between the Private Cloud Routing Server, the Private Cloud Call-Back Server, and the Smart Device Client in accordance with the present invention.

FIG. 4 shows a block diagram of a third embodiment of the invention. The Private Cloud Routing Server 408 connects to the cloud and has a public_IP_P 417. The PCRS 408 also has a physical LAN LAN2 460 connecting downstream. A Private Network Service 436, and a Smart Device Client 435 are connected downstream. The Private Network Service 436 is accessible through the communication path 426, connecting through LAN 434 to Private Cloud Routing Server 408. As long as the virtual LAN 440, the physical LAN LAN2 460 are all explorable and accessible by the Smart Device Clients 411, 410, 409, 401, 421, and 435 across the cloud through the Private Cloud Call-Back Server 416, and the Private Cloud Routing Server 408, all Private Network Service 436, and Smart Device Client 435 become accessible.

FIG. 5 shows the communication flow of the Initializing and Provisioning of the Private Cloud Routing Server by the PCRS Admin in accordance with the present invention. As shown in FIG. 5, from the PCRS Admin Device standpoint, first connect the PCRS Admin device to the PCRS network on LAN, via step 500. Then, open PCRS_Device_App from PCRS LAN, via step 501. Thereafter, discover and select PCRS Address_PCRS on LAN, via step 502. Then the "Initialize and Provision" command on PCRS_Device_App is selected, via step 503. Thereafter, the PCRS is configured by setting address, password (Address_PCRS, Password_PCRS) as its identity, via step 504. Then the PCRS is logged in with Admin credentials ("Initialize and Provision", Admin_name, Admin_password, Address_PCRS, Password_PCRS), via step 505. The credentials are sent to PCRS Utility 510, via step 540. Thereafter, the Admin waits for PCRS authentication, via step 506. Then the Virtual LAN subnet and PCRS App link are configured, via step 507. The PCRS Utility 514 is sent, via step 542. Thereafter, the PCRS is joined to the existing access point router as a client, if desired, via step 508. Thereafter this information is sent to PCRS Utility 516 via step 543.

From PCRS Utility standpoint, accept PCRS Admin credentials ("Initialize and Provision", Admin_name, Admin_password, Address_PCRS, and Password_PCRS), via step 510. Thereafter, the Admin credentials (Admin_name, Admin_password) are authenticated, via step 511. Thereafter the credentials are sent to Admin Device 506, via step 541. Then (Address_PCRS, Password_PCRS) are stored as the identity for PCRS, via step 512. Then (Address_PCRS, Password_PCRS) are registered to a Routing Server Message Box, via step 513. Thereafter, the Virtual LAN subnet and PCRS App link are stored, via step 514. Thereafter the PCRS_Profile file is generated and saved including interface protocol, certificates and keys, via step 515. Finally, an existing access point router as a client is joined, if desired, via step 516.

FIG. 6 shows the communication flow of creating a client for Private Cloud Call-Back Server by the PCCBS Admin in accordance with the present invention. From PCCBS Admin Device 201 standpoint, first the PCCBS_Device_App from WAN is opened, via step 600. Next, a PCCBS 216 at Address_PCCBS is discovered and selected, via step 601. Thereafter a "Create a Client" command on PCCBS_Device_App is selected via step 602. Thereafter an Invitee notification address Address_Invitee is set, via step 603. Then the PCCBS 216 is logged in with Admin credentials ("Create a Client", Admin_name, Admin_password, Address_Invitee), via step 604. Thereafter the credentials are sent to a PCCBS_Device Utility, via step 640. Thereafter the administrator 277 waits for PCCBS authentication, via step 605.

From the PCCBS_Device Utility standpoint, first the PCCBS Admin credentials ("Create a Client", Admin_name, Admin_password, Address_Invitee) are accepted, via step 610. Thereafter, the Admin credentials (Admin_name, Admin_password), are authenticated, via step 611. Then the credentials are sent to the Admin Device via step 641. Next, an Access_Code and Code_Expiration for Access_Code is generated, via step 612. Thereafter, (Access_Code, Code_Expiration, Address_Invitee) is stored into entry (Access_Code, Code_Expiration, Address_Invitee, Address_PCCBS_Device_Client, Hash_Password_PCCBS_Device_P2P, Password_PCCBS_Device_P2P_Expiration, Status) in PCCBS_Device Client database, via step 613. Then an Invitation to Invitee notification address Address_Invitee with (PCCBS_Device app link, Address_PCCBS_Device, Access_Code and Code_Expiration) is sent, via step 614. Send to Invitee 620 via 642.

From Invitee Device standpoint, accept invitation on Address_Invitee with PCCBS_Device app link, Address_PCCBS_Device, Access_Code and Code_Expiration, via step 620. Then PCCBS_Device_App is retrieved from PCCBS_Device app link, via step 621. Finally the PCCBS_Device_App is installed on the PCCBS Device Client 201, 209, 210 or 211, via step 622.

FIG. 7 shows the communication flow of Registering to a Private Cloud Call-Back Server by a PCCBS Device Client in accordance with the present invention. From the PCCBS Device Client standpoint, the PCCBS_Device_App from the WAN or the PCRS LAN is open, via step 700. Next, the PCCBS_Device Client address (Address_PCCBS_Device_Client) is created, if necessary (not shown). Next, "Register a Private Cloud Call-Back Server" command on the PCCBS_Device_App is selected, via step 701. Next, if the PCCBS_Device Client is not yet configured, the Address_PCCBS_Device_Client and the Password_PCCBS_Device_Client are set, via step 702, where the Password_PCCBS_Device_P2P is the message box password associated with message box (not shown) address for client at the Address_PCCBS_Device_Client for peer-to-peer communication. Next, the Address_PCCBS_Device_Client and the Password_PCCBS_Device_Client are registered to Client Message Box, via step 702. The Address_PCCBS_Device and the Access_Code are then retrieved from Invitee, via step 703. The information is originally received by the invitee device 620.

Next, the Address_PCCBS_Device and the Access_Code are sent to the PCCBS through client message box with the Client credentials ("Register a Private Cloud Call-Back Server", Address_PCCBS_Device, Address_PCCBS_Device_Client, Access_Code), via step 704. Then the Address_PCCBS_Device and the Access_Code are sent to the PCCBS Device 710, via step 740. Next, the PCCBS Device Client waits for the PCCBS authentication through client message box, via step 705. Then the PCCBS Device Client waits for the PCCBS registration complete acknowledgement through client message box, via step 706. Next, the Address_PCCBS_Device entry in the PCCBS_Device Server database is registered on the PCCBS_Device_App if it is a new entry, via step 707.

From the PCCBS_Device Utility standpoint, the PCCBS_Device Client credentials ("Register a Private Cloud Call-Back Server", Address_PCCBS_Device, Address_PCCBS_Device_Client, Access_Code) are accepted, via step 710. Verification is made to check if the Address_PCCBS_Device_Client is in the PCCBS_Device Client database, via step 712. If so, Invitee's designated PCCBS_Device Client address (Address_PCCBS_Device_Client) is acknowledged with the PCCBS_Device address (Address_PCCBS_Device), via step 719, then return. Otherwise, the Access_Code is authenticated, via step 712. Next, the Code_Expiration on Access_Code is authenticated in the PCCBS_Device Client database, via step 713. Next, the Code_Expiration on the Access_Code is sent to the PCCBS Device Client 705 via 741. Next, (Password_PCCBS_Device_P2P, Password_PCCBS_Device_P2P_Expiration, Status) associated with (Access_Code, Code_Expiration, Address_Invitee, Address_PCCBS_Device_Client) are generated, via step 714. Next, the hashed value of the Password_PCCBS_Device_P2P is saved as Hash_Password_PCCBS_Device_P2P 715. Next, (Address_ PCCBS_Device_Client, Hash_Password_PCCBS_Device_P2P, Password_PCCBS_Device_P2P_Expiration, Status) are stored into entry (Access_Code, Code_Expiration, Address_Invitee, Address_PCCBS_Device_Client, Hash_Password_PCCBS_Device_P2P, Password_PCCBS_Device_P2P_Expiration, Status) in the PCCBS_Device Client database, via step 716. Next, the Password_PCCBS_Device_P2P is sent to Invitee notification address at Address_Invitee, via step 717. Next, the Password_PCCBS_Device_P2P is sent to Invitee 720, via step 743. Next, the Password_PCCBS_Device_P2P is cleared, via step 718. Next, Invitee's designated PCCBS_Device Client address (Address_PCCBS_Device_Client) is acknowledged with PCCBS_Device address (Address_PCCBS_Device), via step 719. Next, Invitee's designated PCCBS_Device Client address is sent to the PCCBS Device Client 706, via step 744. From Invitee Device point of view, the Password_PCCBS_Device_P2P is accepted and saved for future use, via step 720.

FIG. 8 shows the communication flow of Connection from the PCCBS Device Client to the Private Cloud Call-Back Server by a PCCBS_Device Client in accordance with the present invention. From the PCCBS Device Client standpoint, the PCCBS_VPN_App is open from the WAN, via step 800. Next, an Address_PCCBS_VPN is selected from the registered PCCBS_VPN database, via step 801. Next, "Connect to PCCBS_VPN" command is selected on the PCCBS_VPN_App, via step 802. Next, peer-to-peer connection request is sent to the Address_PCCBS_VPN, via step 803. Next, the peer-to-peer connection request is sent to the PCCBS_VPN Utility 810, via step 840. Next, peer-to-peer negotiation starts using the Address PCCBS VPN Client to communicate with the PCCBS VPN at Address_PCCBS_VPN, via step 804. Next, the PCCBS Device Client communicates with the PCCBS_VPN Utility 811, via step 841. Next, the PCCBS_VPN_Profile file is accepted to start the Smart VPN connection with the PCCBS_VPN at the Address_PCCBS_VPN, via step 805. Next, pee-to-peer connection is established between the PCCBS_VPN and the Device Client, via step 806. Next, the PCCBS Device Client communicates with the PCCBS_VPN Utility 813, via step 843. Next, the PCCBS_VPN is logged in with the Client credentials ("Connect to PCCBS_VPN", Address_PCCBS_VPN, Address_PCCBS_VPN_Client, Password_PCCBS_VPN_P2P), via step 807. Next, the Client credentials are sent to the PCCBS_VPN Utility 814, via step 844. Next, the PCCBS Device Client waits for authentication, via step 808. Next, secure peer-to-peer communication starts, via step 809. Next, the PCCBS Device Client communicates with the PCCBS_VPN Utility 817, via step 846. Next, the PCCBS Device Client securely connects to the virtual private LAN on the PCCBS_VPN, via step 820.

From PCCBS_VPN Utility standpoint, peer-to-peer connection request is accepted from the Address_PCCBS_VPN_Client, via step 810. Next, peer-to-peer negotiation starts using the Address_PCCBS_VPN to communicate with the PCCBS_VPN Client at the Address_PCCBS_VPN_Client, via step 811. Next, the PCCBS_VPN Utility communicates with the PCCBS Device Client 804, via step 841. Next, the PCCBS_VPN_ Profile file is sent to the Address_PCCBS_VPN_Client to start the Smart VPN connection, via step 812. Next, the PCCBS_VPN_Profile file is sent to the PCCBS Device Client 805, via step 842. Next, pee-to-peer connection is established between the PCCBS_VPN and the Device Client, via step 813. Next, the PCCBS_VPN Utility communicates with the PCCBS Device Client 806, via step 843. Next, the PCCBS_VPN Client credentials ("Connect to PCCBS_VPN", Address_PCCBS_VPN, Address_ PCCBS_VPN_Client, Password_PCCBS_VPN_P2P) are accepted, via step 814. Next, entry list based on the Address_ PCCBS_VPN_Client in the PCCBS_VPN Client database (Access_Code, Code_Expiration, Address_Invitee, Address_PCCBS_VPN_Client, Hash_Password_PCCBS_VPN_P2 P, Password_PCCBS_VPN_P2P_Expiration, Status) is searched, via step 815. Next, existing peer-to-peer (P2P) password is authenticated by checking if the hashed value matches the Hash_Password_PCCBS_VPN_P2P entry based on the Address_PCCBS_VPN_Client in the PCCBS_VPN Client database, via step 816. Next, existing peer-to-peer (P2P) password is sent to the PCCBS Device Client 808, via step 845. Next, secure peer-to-peer communication starts, via step 817. Next, the PCCBS_VPN Utility communicates with the PCCBS Device Client 809, via step 846. Next, the PCCBS_VPN Utility calls back to PCRS and starts peer-to-peer communication with the PCRS 818. Next, the PCCBS Device Client securely connects to virtual private LAN on PCRS 820, via step 847. Next, the PCCBS_VPN Utility establishes peer-to-peer communication channel between the PCRS Device Client and the PCRS Device Client or another PCCBS Device Client 819. Next, the PCCBS Device Client starts connecting to the PCRS Device Client or another PCCBS Device Client 821, via step 848.

FIG. 9 shows the communication flow of Viewing Client of the Private Cloud Call-Back Server by PCCBS Admin in accordance with the present invention. From the Admin Device standpoint, the PCCBS_Device_App is open from the WAN, via step 900. Next, an Address_PCCBS_Device is selected from the registered PCCBS_Device database, via step 901. Next, "View PCCBS_Device Client" command is selected on the PCCBS_Device_App, via step 902. Next, a View entry in the PCCBS_Device Client database is selected as a look-up index, via step 903. Next, the PCCBS is logged in with the Admin credentials ("View PCCBS_Device Client", Admin_name, Admin_password, View entry), via step 904. Next, the Admin credentials are sent to the PCCBS_Device Utility 910, via step 940. Next, the Admin Device waits for the PCCBS authentication, via step 905. Next, entry list in the PCCBS_Device Client database (Access_Code, Code_Expiration, Address_Invitee, Address_PCCBS_Device_Client, Hash_Password_PCCBS_Device_P2P, Password_PCCBS_Device_P2P_Expiration, and Status) is displayed based on the look-up index, via step 906.

From PCCBS_Device Utility standpoint, the PCCBS_Device Client credentials ("View PCCBS_Device Client", Admin_name, Admin_password, View entry) are accepted, via step 910. Next, the Admin credentials (Admin_name, Admin_password) are authenticated, via step 911. Next, the Admin credentials are sent to the Admin Device 905, via step 941. Next, the View entry is used as a look-up index, reply from entry list in the PCCBS_Device Client database (Access_Code, Code_Expiration, Address_Invitee, Address_PCCBS_Device_Client, Hash_Password_PCCBS_Device_P2P, Password_PCCBS_Device_P2P_Expiration, Status) based on the look-up index, via step 912. Next, the replay is sent to the Admin Device 906, via step 942.

FIG. 10 shows the communication flow of Resetting peer-to-peer password and editing attributes of a PCCBS Device Client by PCCBS Admin in accordance with the present invention. From the Admin Device standpoint, the PCCBS_Device_App is open from the WAN, via step 1000. Next, an Address_PCCBS_Device is select from the registered PCCBS_Device database, via step 1001. Next, "Reset P2P Password/Edit Attributes" command is select on the PCCBS_Device_App, via step 1002. Next, the Invitee notification address Address_Invitee is entered as a look-up index, via step 1003. Next, the PCCBS is logged in with the Admin credentials ("Reset P2P Password/Edit Attributes", Admin_name, Admin_password, and Address_Invitee), via step 1004. Next, the Admin credentials are sent to the PCCBS_Device Utility 1010, via step 1040. Next, the Admin Device waits for the PCCBS_Device authentication, via step 1005. Next, the entry list based on the Address_Invitee in the PCCBS_Device Client database (Access_Code, Code_Expiration, Address_Invitee, Address_PCCBS_Device_Client, Hash_Password_PCCBS_Device_P2P, Password_PCCBS_Device_P2P_Expiration, Status) is displayed, via step 1006. If "Reset P2P Password" command is selected, the Admin Device waits for completion, via step 1007. If "Edit Attributes" is selected, the Attributes are edited as desired, via step 1008. Next, the Attributes include but are not limited to Status of the PCCBS_Device Client (Active, Inactive, Deleted), the Virtual LAN subnet and the PCCBS_Device App link. Next, the Attributes are sent to the PCCBS_Device Utility 1017, via step 1044.

From the PCCBS_Device Utility standpoint, the PCCBS Admin credentials ("P2P Password/Edit Attributes", Admin_ name, Admin_password, and Address_Invitee) are accepted, via step 1010. The Admin credentials (Admin_name, Admin_password) are authenticated, via step 1011. Next, the PCCBS Admin credentials are sent to the Admin Device 1005, via step 1041. Next, the Address_Invitee is used as a look-up index, reply entry list based on Address_Invitee in PCCBS_Device Client database (Access_Code, Code_Expiration, Address_Invitee, Address_PCCBS_Device_Client, Hash_Password_PCCBS_Device_P2P, Password_PCCBS_Device_P2P_Expiration, and Status), via step 1012. Next, the replay is sent to the PCCBS_Device Utility 1006, via step 1042. If "Reset P2P Password" command is selected, via step 1013, a new Password_PCCBS_Device_P2P is generated; the hashed value of Password_PCCBS_Device_P2P in Hash_Password_PCCBS_Device_P2P is saved, via step 1014. Next, the new Password_PCCBS_Device_P2P is sent to the Admin Device 1007, via step 1043. Next, (Access_Code, Password_PCCBS_Device_P2P) is sent to invitee notification address Address_Invitee; Password_PCCBS_Device_P2P is cleared, via step 1015. Next, (Access_Code, Password_PCCBS_Device_P2P) is sent to Invitee 1020, via step 1045. If "Edit Attributes" command is selected, via step 1016, the edited Attributes are accepted and stored in the PCCBS_Device, via step 1017.

From the Invitee Device standpoint, (Access_Code, Password_PCCBS_Device_P2P) are accepted in invitee notification address Address-Invitee, via step 1020.

FIG. 11 shows the communication flow of changing peer-to-peer password of a PCCBS Device Client by a PCCBS_Device Client in accordance with the present invention. From the PCCBS Device Client standpoint, the PCCBS_Device_App is open on the WAN after secure VPN connection from the WAN, via step 1100. Next, an Address_PCCBS_Device is selected from the registered PCCBS_Device database, via step 1101. Next, "Change P2P Password" command is selected on the PCCBS_Device_App, via step 1102. The PCCBS is logged in with the Client credentials ("Change P2P Password", Address_PCCBS_Device, Address_PCCBS_Device_Client, and Password_PCCBS_Device_P2P), via step 1103. Next, the Client credentials are sent to the PCCBS_Device Utility 1110, via step 1140. Next, the PCCBS Device Client waits for the PCCBS_Device authentication, via step 1104. Next, the new P2P passwords are entered and re-entered till they match, via step 1105. Next, the new P2P passwords are sent to the PCCBS_Device Utility 1113, via step 1142.

From PCCBS_Device Utility standpoint, the PCCBS_Device Client credentials ("Change P2P Password", Address_PCCBS_Device, Address_PCCBS_Device_Client, and Password_PCCBS_Device_P2P) are accepted, via step 1110. Next, the Hash_Password_PCCBS_Device_P2P entry is searched based on the Address_PCCBS_Device_Client in the PCCBS_Device Client database, via step 1111. Next, existing P2P password is authenticated by checking if the hashed value matches the Hash_Password_PCCBS_Device_P2P entry based on the Address_PCCBS_Device_Client in the PCCBS_Device Client database (Access_Code, Code_Expiration, Address_Invitee, Address_PCCBS_Device_Client, Hash_Password_PCCBS_Device_P2P, Password_PCCBS_Device_P2P_Expiration, Status), via step 1112. Next, the existing P2P password is sent to the PCCBS Device Client 1104, via step 1141. Next, the new P2P password Password_PCCBS_Device_P2P is accepted, via step 1113. Next, the new P2P password is hashed as Hash_Password_PCCBS_Device_P2P, via step 1114. Next, the Hash_Password_PCCBS_Device_P2P entry is updated based on the Address_PCCBS_Device_Client in the PCCBS_Device Client database (Access_Code, Code_Expiration, Address_Invitee, Address_PCCBS_Device_Client, Hash_Password_PCCBS_Device_P2P, Password_PCCBS_Device_P2P_Expiration, and Status), via step 1115. Next, the P2P password Password_PCCBS_Device_P2P is cleared, via step 1116.

Figure 12:
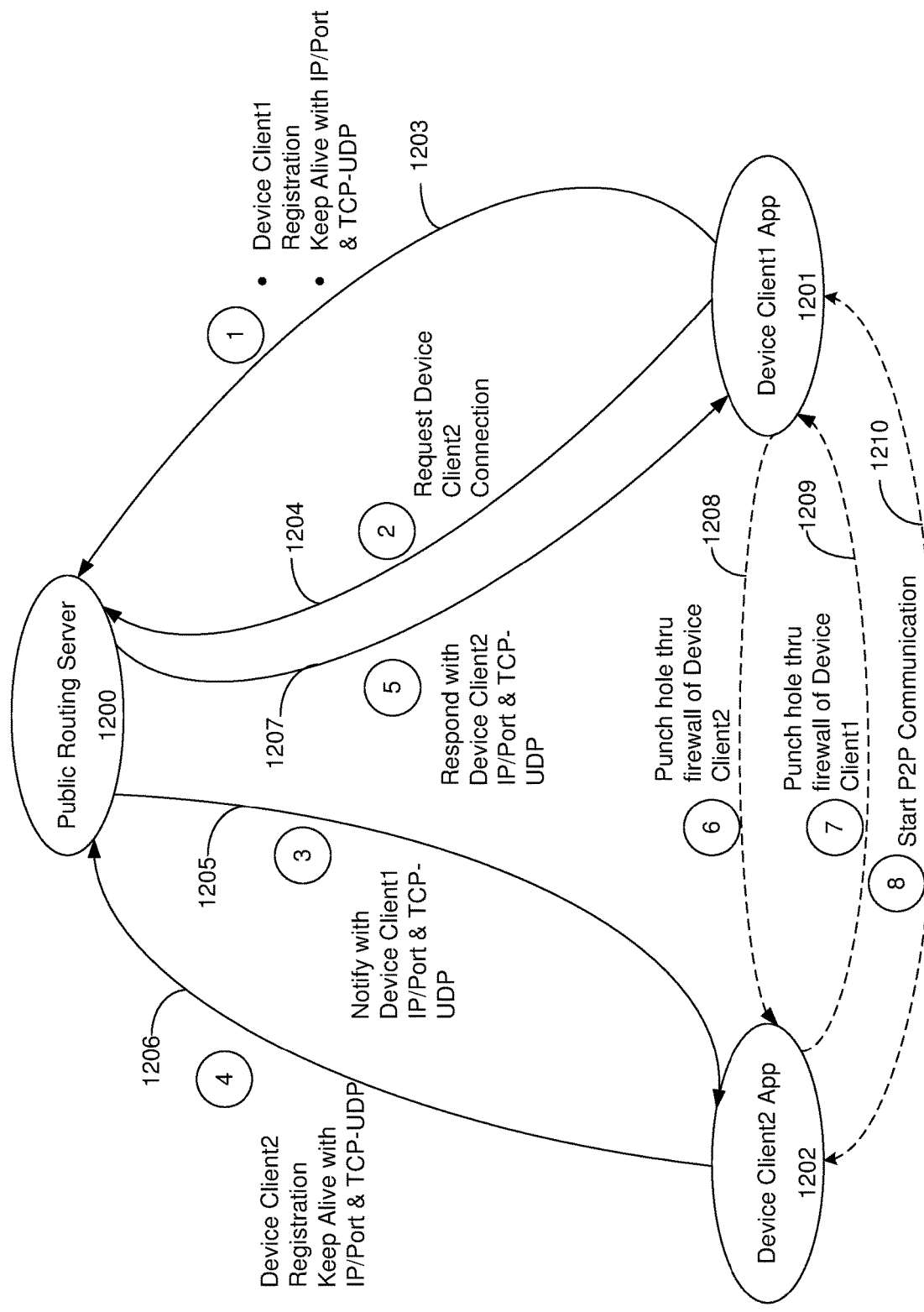
FIG. 12 shows the communication flow of P2P Connection Mechanism between a Device Client1 and a Device Client2 through Cloud Network (Prior Art).

FIG. 12 shows the communication flow of P2P Connection Mechanism between a Device Client1 and a Device Client2 through Cloud Network (Prior Art). A Device Client1 and a Device Client2 on Cloud Network can communicate with each other through a Public Routing Server or a Public VPN Routing Server 112, 114. The Device Client1 App 1201 first register to the Public VPN Routing Server Utility 1200 with its IP address and port capability in TCP/UDP protocols. The Device Client1 App, IP address and ports are kept alive with the routing server 1203. The Device Client1 then requests to the routing server utility 1200 for connection to the Device Client2 1204. The routing server utility 1200 then notifies the Device Client2 Utility 1202 with the IP address and port capability in TCP/UDP protocols of the Device Client1 and its intention to connect 1205. The Device Client2 App 1202 then replies to the routing server utility 1200 with its own registration that includes its IP address and port capability in TCP/UDP protocols. The IP address and port capability of the Device Client2 are kept alive with connection to the routing server utility 1200. The routing server utility 1200 then responds to the Client Devic1 App 1201 with the IP address and port capability in TCP/UDP protocols of the Client Devic2 1207. After receiving the IP address and port capability in TCP/UDP protocols of the Device Client2, the Device Client1 App 1201 starts punching holes through the firewall of the Device Client2 1208. The Device Client2 App 1202 also starts punching holes through the firewall of the Device Client1 1209. Eventually, both sides of the firewall holes are punched through. The peer-to-peer communication starts between the Device Client1 and the Device Client2 1210. Note that without the Public VPN Routing Server, the connection mechanism between the routing server utility and either Device Client1 or Device Client2 is not possible. It is the fundamental flaw of the connection mechanism that has to rely on a Public VPN Routing Server.

Figure 13:
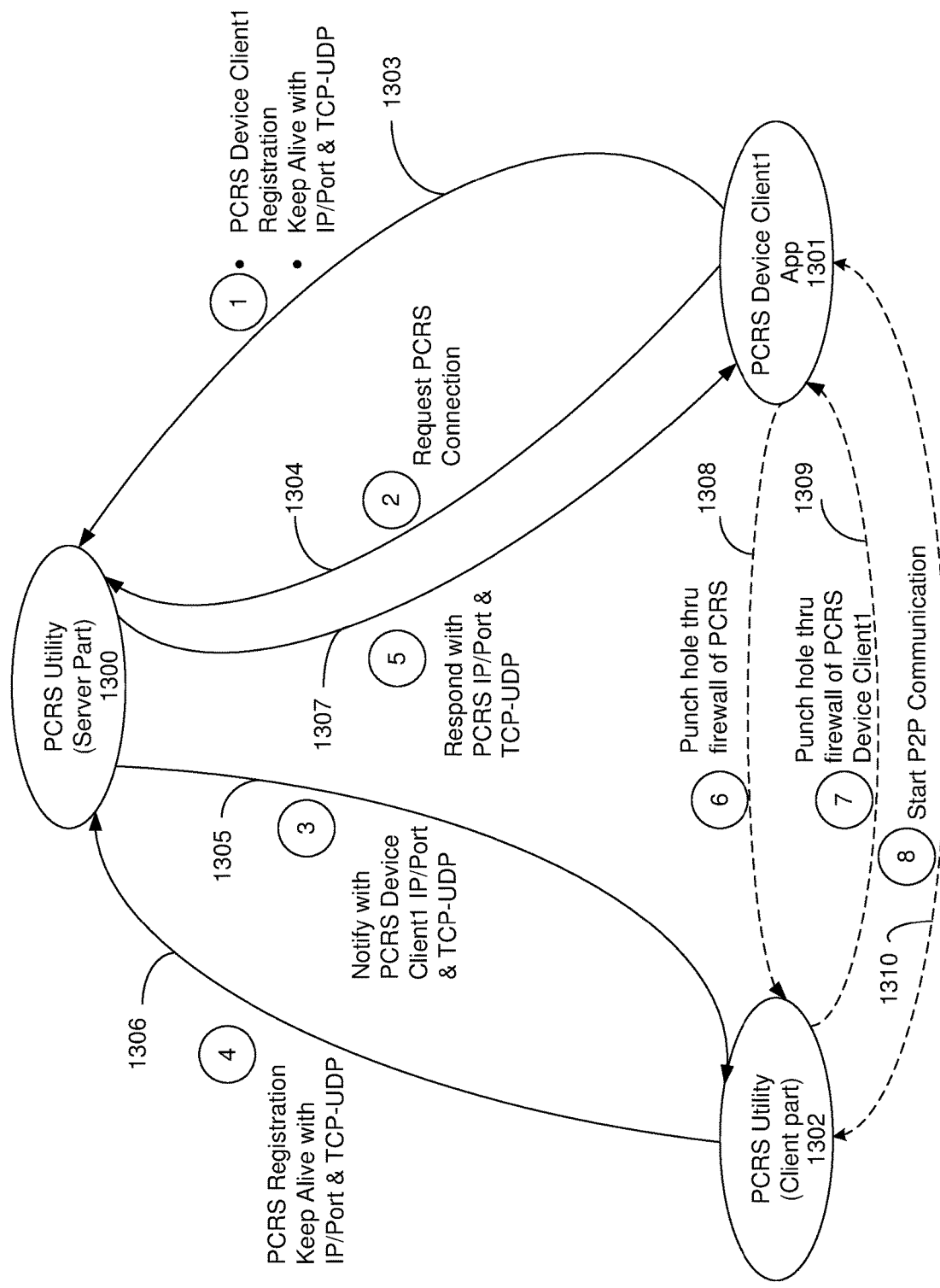
FIG. 13 is a diagram of a communication flow of P2P Connection Mechanism between PCRS and a PCRS Device Client through a Cloud Network (Prior Art).

FIG. 13 is a diagram of a communication flow of P2P Connection Mechanism between PCRS and a PCRS Device Client through a Cloud Network (Prior Art). It shows in accordance to the present invention that no Public VPN Routing Server is required for the Device Clients to connect and access to either the Server, or another Device Client, or the network services under the server through Cloud Network. As shown in FIG. 13, a Device Client1 and a Private Cloud Routing Server (PCRS) on Cloud Network can communicate with each other without going through a Public Routing Server or a Public VPN Routing Server 112, 114. The Device Client1 App 1301 first requests to connect to the PCRS Utility (Server part) 1300 through Client Message Box 215, and PCRS Utility 803 as shown in FIG. 8, with its IP address and port capability in TCP/UDP protocols. The PCRS Device Client1 App, IP address and ports are kept alive with the PCRS Utility 1303. The PCRS Utility (Server part) receives the registration through Call-Back Server Message Box (not shown). The PCRS Device Client1 then requests to the PCRS Utility (Server part) 1300 also through Client Message Box 215 for connection to the PCRS Utility (Client part) 1304. The PCRS Utility (Server part) 1300 receives the request through Call-Back Server Message Box (not shown) and notifies the PCRS Utility (Client part) 1302 with the IP address and port capability in TCP/UDP protocols of the PCRS Device Client1 and its intention to connect 1305. The PCRS Utility (Client part) 1302 then replies to the PCRS Utility (Server part) 1300 with its own registration that includes its IP address and port capability in TCP/UDP protocols. The IP address and port capability of the Device Client2 are kept alive with connection to the PCRS Utility (Server part) 1300. The PCRS Utility (Server part) 1300 then responds to the Client Devic1 App 1301 with the IP address and port capability in TCP/UDP protocols of the Client Devic2 1307 through Call-Back Server Message Box (not shown). After receiving the IP address and port capability in TCP/UDP protocols of the PCRS Utility (Client part) through Client Message Box 215, the PCRS Device Client1 App 1301 starts punching holes through the firewall of the PCRS Utility (Client part) 1308. The PCRS Utility (Client part) 1302 also starts punching holes through the firewall of the PCRS Device Client1 1309. Eventually, both sides of the firewall holes are punched through. The peer-to-peer communication starts between the PCRS Device Client1 and the PCRS Utility (Client part) 1310. All information exchange between the PCRS Utility and the PCRS Device Client1 are through Call-Back Server Message Box (not shown) and Client Message Box 215, instead of going through a Public Routing Server 212 or a Public VPN Routing Server 214. PCRS Device Client1 can then securely connect to virtual private LAN on PCRS as shown in 820. The PCRS Device Client1 is able to access any Device Client 206 or private network service 228 accessible under the PCRS. Other PCRS Device Clients 201, 221, 209, 210, 211 can connect to the PCRS through the same connection mechanism as shown in FIG. 13. Once any pair of PCRS Device Clients and PCCBS Device Clients connect to the virtual private LAN 240 and the virtual private LAN 2400 of the PCRS and the PCCBS, they can conduct the private and secure communication between themselves for text, audio or video communication.

Figure 14:
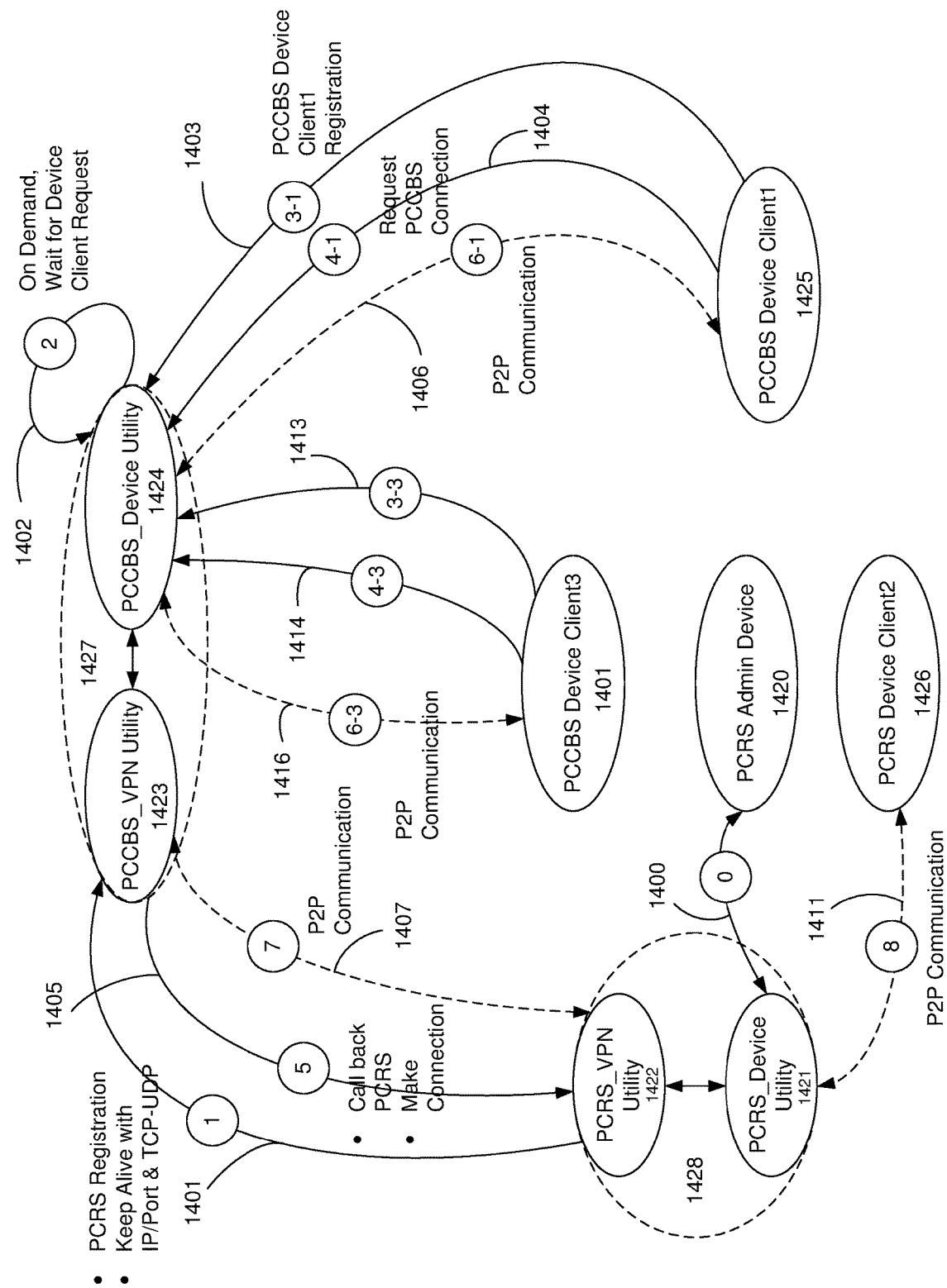
FIG. 14 is a diagram of a communication flow of P2P Connection Mechanism between PCRS, PCCBS, PCCBS Device Client and a PCRS Device Client through a Cloud Network.

FIG. 14 is a diagram of a communication flow of P2P Connection Mechanism between PCRS, PCCBS, a PCRS Device Client and a PCCBS Device Client through a Cloud Network. It shows in accordance to the present invention that no public cloud Routing Server is required for the Device Clients to connect and access to either the Server PCRS, PCCBS, or another Device Client, or the network services under the server through Cloud Network. As shown in FIG. 14, a Device Client1 and a Private Cloud Routing Server (PCRS) on Cloud Network can communicate with each other without going through a Public Routing Server or a Public VPN Routing Server 112, 114. The PCRS Admin Device 1420 first initializes and provisions the PCRS 1428 through the PCRS Device Utility 1421, as described in FIG. 5 and circle 0, 1400. The PCRS Utility 1421 then passes the info internally inside PCRS 1428, to PCRS_VPN Utility 1422. It then registers to the PCCBS VPN Utility 1423 with the PCRS registration info that includes the IP address and port capability in TCP/UDP protocols, as in FIG. 15 and circle 1, 1401. It also establishes the PCCBS tuple and communication socket, 1600. The IP address and port capability of the Device Client2 are kept alive with connection to the PCCBS Utility 1401. After registration, the PCRS_VPN Utility connects to the PCCBS_VPN 1602 and establishes peer-to-peer communication channel between PCRS_VPN and PCCBS_VPN 1619, as in FIG. 16. The PCCBS_VPN Utility 1423 communicates with the PCCBS_Device Utility 1424, internally inside the PCCBS 1427. The PCCBS_Device Utility stays in a loop waiting on demand for the PCCBS Device Client request, as circle 2, 1402. The PCCBS Device Client1 1405 first registers to the PCCBS_Device Utility 1424 as shown in FIG. 7, with its IP address and port capability in TCP/UDP protocols. The PCCBS Device Client1, IP address and ports are kept alive with the PCCBS_Device Utility 1424, as in FIG. 7 and circle 3-1, 1403. The PCCBS_Device Utility 1424 passes the registration and the connection request internally inside PCCBS 1427, to the PCCBS_VPN Utility 1423. After registration, the PCCBS Device Client1 1425 connects to the PCCBS_VPN 802 and establishes peer-to-peer communication channel between PCCBS Device Client1 1424 and PCCBS_VPN 817, as in FIG. 8. The PCCBS_VPN Utility 1423 then calls back to PCRS_VPN Utility 1422 to establish peer-to-peer communication channel between PCCBS_VPN Utility 1423 and PCRS_VPN Utility 1422, as in FIG. 14, circle 5, 1405, circle 7, 1407 and in FIG. 8, 818. After the call-back action is successful from PCCBS_VPN Utility 1423 to PCRS_VPN Utility 1422, the peer-to-peer communication channel is finally established between PCCBS_Device Client1 and PCRS_VPN and in turn connecting to a PCRS Device Client2 1426 or yet another PCCBS Device Client3 1401, assuming another PCCBS Device Client3 has also successfully connected to the PCCBS_VPN Utility 1423. The call-back action 818 from the PCCBS_VPN Utility to the PCRS_VPN Utility 1422 is explained in details in FIG. 17.

Figure 15:
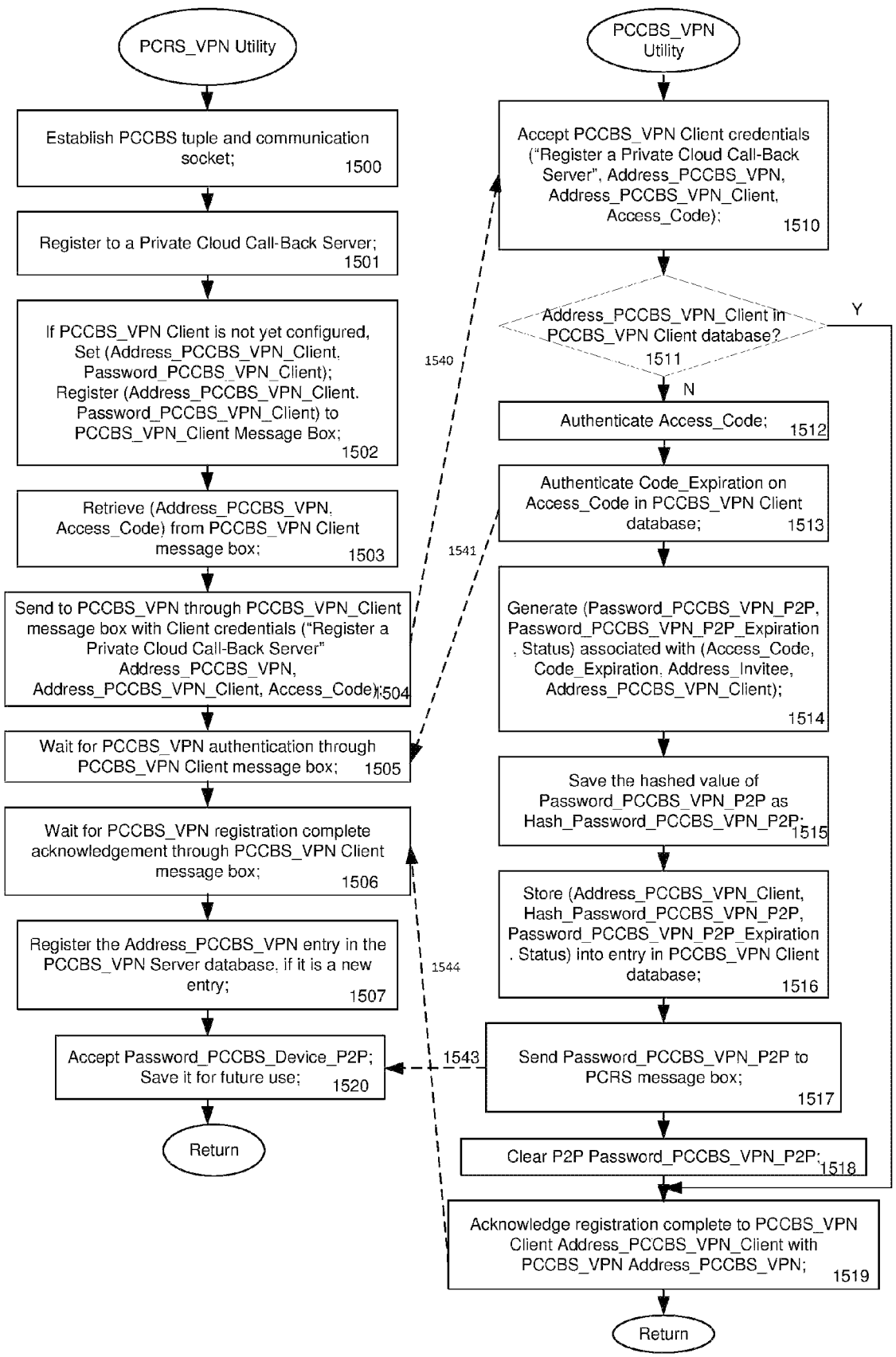
FIG. 15 shows the communication flow of Registering to a Private Cloud Call-Back Server VPN by a PCRS in accordance with the present invention.

FIG. 15 shows the communication flow of Registering to a Private Cloud Call-Back Server by a PCRS in accordance with the present invention. From the PCRS standpoint, the PCCBS tuple and the communication socket are established, via step 1500. Next, the PCCBS_Device Client address (Address_PCCBS_Device_Client) is created, if necessary (not shown). Next, "Register a Private Cloud Call-Back Server" command is issued, via step 1501. Next, if the PCCBS_Device Client is not yet configured, the Address_PCCBS_Device_Client and the Password_PCCBS_Device_Client are set, via step 1502, where the Password_PCCBS_Device_P2P is the message box password associated with message box (not shown) address for client at the Address_PCCBS_Device_Client for peer-to-peer communication. Next, the Address_PCCBS_Device_Client and the Password_PCCBS_Device_Client are registered to Client Message Box, via step 1502. The Address_PCCBS_Device and the Access_Code are then retrieved from Invitee, via step 1503. The information is originally received by the invitee device 620.

Next, the Address_PCCBS_Device and the Access_Code are sent to the PCCBS through client message box with the Client credentials ("Register a Private Cloud Call-Back Server", Address_PCCBS_Device, Address_PCCBS_Device_Client, Access_Code), via step 1504. Then the Address_PCCBS_Device and the Access_Code are sent to the PCCBS Device 1510, via step 1540. Next, the PCRS waits for the PCCBS authentication through client message box, via step 1505. Then the PCRS waits for the PCCBS registration complete acknowledgement through client message box, via step 1506. Next, the Address_PCCBS_Device entry in the PCCBS_Device Server database is registered on the PCCBS_Device_App if it is a new entry, via step 1507.

From the PCCBS_Device Utility standpoint, the PCCBS_Device Client credentials ("Register a Private Cloud Call-Back Server", Address_PCCBS_Device, Address_PCCBS_Device_Client, Access_Code) are accepted, via step 1510. Verification is made to check if the Address_PCCBS_Device_Client is in the PCCBS_Device Client database, via step 1512. If so, Invitee's designated PCCBS_Device Client address (Address_PCCBS_Device_Client) is acknowledged with the PCCBS_Device address (Address_PCCBS_Device), via step 1519, then return. Otherwise, the Access_Code is authenticated, via step 1512. Next, the Code_Expiration on Access_Code is authenticated in the PCCBS_Device Client database, via step 1513. Next, the Code_Expiration on the Access_Code is sent to the PCRS 1505 via 1541. Next, (Password_PCCBS_Device_P2P, Password_PCCBS_Device_P2P_Expiration, Status) associated with (Access_Code, Code_Expiration, Address_Invitee, Address_PCCBS_Device_Client) are generated, via step 1514. Next, the hashed value of the Password_PCCBS_Device_P2P is saved as Hash_Password_PCCBS_Device_P2P 1515. Next, (Address_PCCBS_Device_Client, Hash_Password_PCCBS_Device_P2P, Password_PCCBS_Device_P2P_Expiration, Status) are stored into entry (Access_Code, Code_Expiration, Address_Invitee, Address_PCCBS_Device_Client, Hash_Password_PCCBS_Device_P2P, Password_PCCBS_Device_P2P_Expiration, Status) in the PCCBS_Device Client database, via step 1516. Next, the Password_PCCBS_Device_P2P is sent to the PCRS message box, via step 1517. Next, the Password_PCCBS_Device_P2P is cleared, via step 1518. Next, Invitee's designated PCCBS_Device Client address (Address_PCCBS_Device_Client) is acknowledged with PCCBS_Device address (Address_PCCBS_Device), via step 1519. Next, Invitee's designated PCCBS_Device Client address is sent to the PCRS 1506, via step 1544. From the PCRS point of view, the Password_PCCBS_Device_P2P is accepted and saved for future use, via step 1520.

Figure 16:
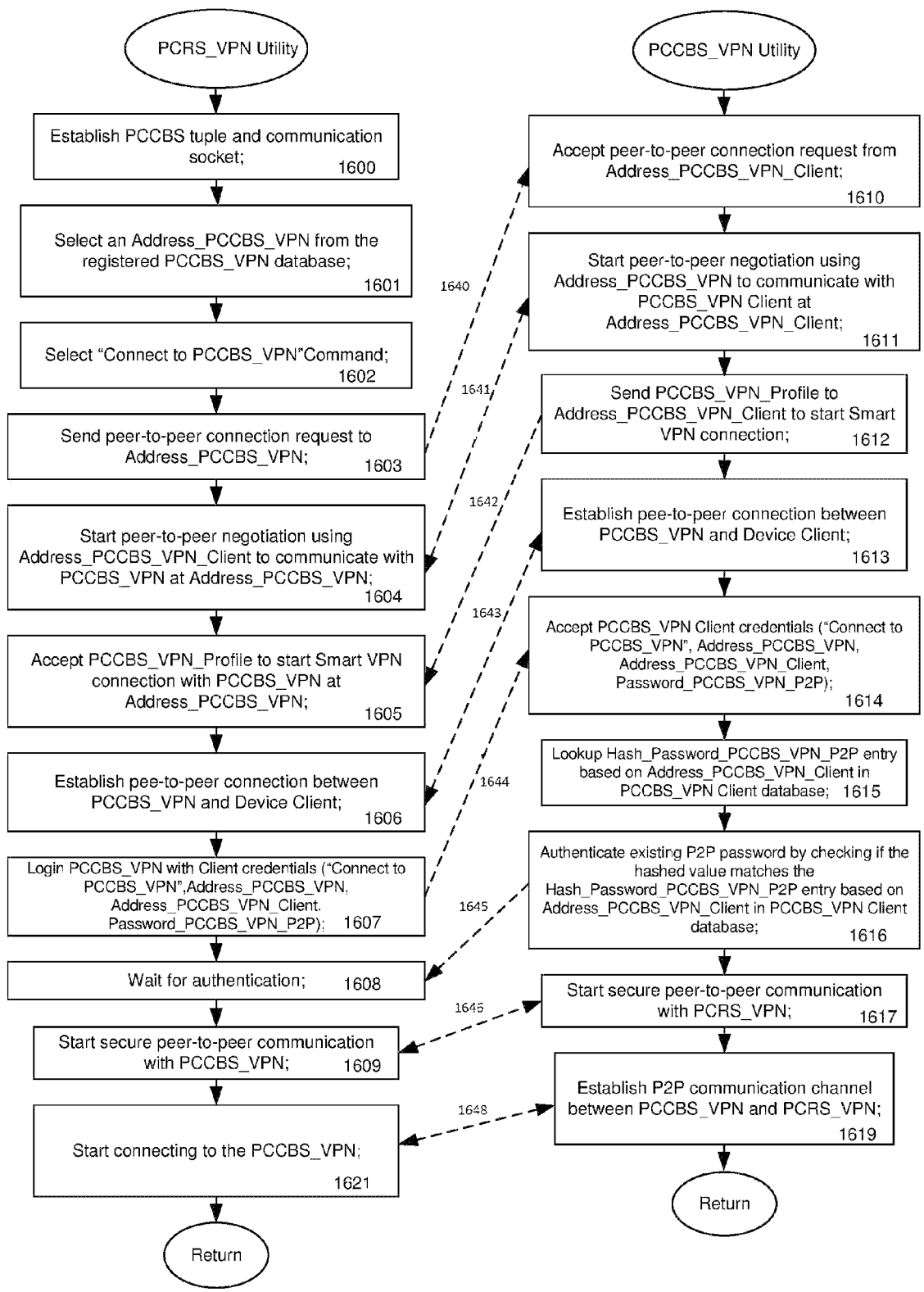
FIG. 16 shows the communication flow of Connection from the PCRS to the Private Cloud Call-Back Server VPN by a PCRSS in accordance with the present invention.

FIG. 16 shows the communication flow of Connection from the PCRS to the Private Cloud Call-Back Server by a PCRS in accordance with the present invention. From the PCRS standpoint, the PCCBS tuple and communication socket are established, via step 1600. Next, an Address_PCCBS_VPN is selected from the registered PCCBS_VPN database, via step 1601. Next, "Connect to PCCBS_VPN" command is selected on the PCCBS_VPN_App, via step 1602. Next, peer-to-peer connection request is sent to the Address_PCCBS_VPN, via step 1603. Next, the peer-to-peer connection request is sent to the PCCBS_VPN Utility 1610, via step 1640. Next, peer-to-peer negotiation starts using the Address_PCCBS_VPN_Client to communicate with the PCCBS_VPN at Address_PCCBS_VPN, via step 1604. Next, the PCRS_VPN communicates with the PCCBS_VPN Utility 1611, via step 1641. Next, the PCCBS_VPN_Profile file is accepted to start the Smart VPN connection with the PCCBS_VPN at the Address_PCCBS_VPN, via step 1605. Next, pee-to-peer connection is established between the PCCBS_VPN and the Device Client, via step 1606. Next, the PCRS_VPN communicates with the PCCBS_VPN Utility 1613, via step 1643. Next, the PCCBS_VPN is logged in with the Client credentials ("Connect to PCCBS_VPN", Address_PCCBS_VPN, Address_PCCBS_VPN_Client, Password_PCCBS_VPN_P2P), via step 1607. Next, the Client credentials are sent to the PCCBS_VPN Utility 1614, via step 1644. Next, the PCRS_VPN waits for authentication, via step 1608. Next, secure peer-to-peer communication starts, via step 1609. Next, the PCRS_VPN communicates with the PCCBS_VPN Utility 1617, via step 1646. Next, the PCRS_VPN securely connects to the virtual private LAN on the PCCBS_VPN, via step 1620.

From PCCBS_VPN Utility standpoint, a peer-to-peer connection request is accepted from the Address_PCCBS_VPN_Client, via step 1610. Next, peer-to-peer negotiation starts using the Address_PCCBS_VPN to communicate with the PCCBS_VPN Client at the Address_PCCBS_VPN_Client, via step 1611. Next, the PCCBS_VPN Utility communicates with the PCRS_VPN 1604, via step 1641. Next, the PCCBS VPN Profile file is sent to the Address PCCBS VPN Client to start the Smart VPN connection, via step 1612. Next, the PCCBS_VPN_Profile file is sent to the PCRS_VPN 1605, via step 1642. Next, pee-to-peer connection is established between the PCCBS_VPN and the Device Client, via step 1613. Next, the PCCBS_VPN Utility communicates with the PCRS_VPN 1606, via step 1643. Next, the PCCBS_VPN Client credentials ("Connect to PCCBS_VPN", Address_PCCBS_VPN, Address_PCCBS_VPN_Client, Password_PCCBS_VPN_P2P) are accepted, via step 1614. Next, entry list based on the Address_PCCBS_VPN_Client in the PCCBS_VPN Client database (Access_Code, Code_Expiration, Address_Invitee, Address_PCCBS_VPN_Client, Hash_Password_PCCBS_VPN_P2P, Password_PCCBS_VPN_P2P Expiration, Status) is searched, via step 1615. Next, existing peer-to-peer (P2P) password is authenticated by checking if the hashed value matches the Hash_Password_PCCBS_VPN_P2P entry based on the Address_PCCBS_VPN_Client in the PCCBS_VPN Client database, via step 1616. Next, existing peer-to-peer (P2P) password is sent to the PCRS_VPN 1608, via step 1645. Next, secure peer-to-peer communication starts, via step 1617. Next, the PCCBS_VPN Utility communicates with the PCRS_VPN 1609, via step 1646. Next, the PCCBS_VPN Utility establishes peer-to-peer communication channel between the PCRS_VPN and the PCCBS_VPN 1619. Next, the PCRS_VPN starts connecting to the PCCBS_VPN 1621, via step 1648.

Figure 17:
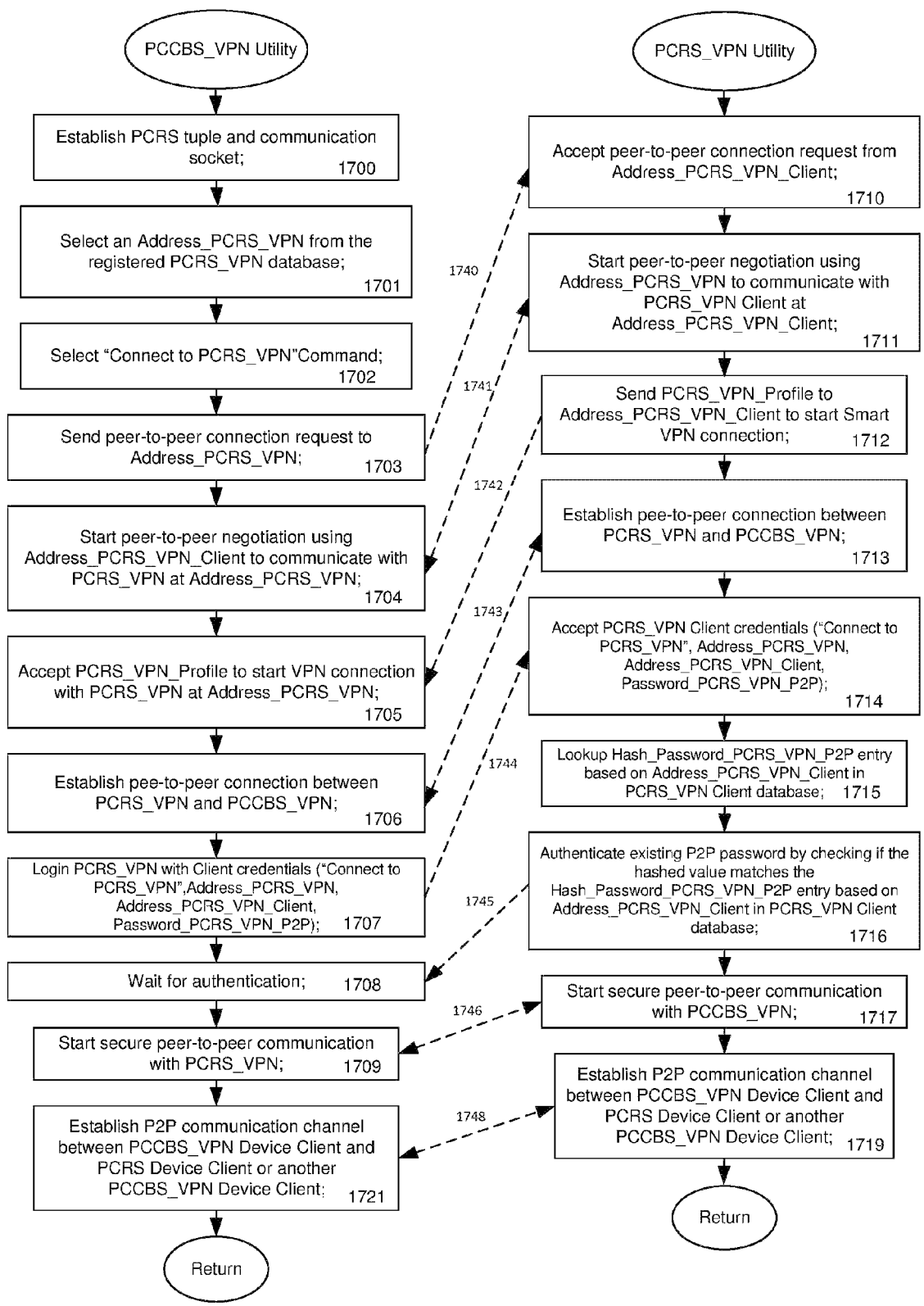
FIG. 17 shows the communication flow of Connection from the PCCBS call-back to the Private Cloud Routing Server VPN by a PCCBS in accordance with the present invention.

FIG. 17 shows the communication flow of Connection from the PCCBS calling back to the Private Cloud Routing Server by a PCCBS in accordance with the present invention. From the PCCBS standpoint, the PCRS tuple and communication socket are established, via step 1700. Next, an Address_PCRS_VPN is selected from the registered PCRS_VPN database, via step 1701. Next, "Connect to PCRS_VPN" command is selected on the PCRS_VPN_App, via step 1702. Next, peer-to-peer connection request is sent to the Address_PCRS_VPN, via step 1703. Next, the peer-to-peer connection request is sent to the PCRS_VPN Utility 1710, via step 1740. Next, peer-to-peer negotiation starts using the Address_PCRS_VPN_Client to communicate with the PCRS_VPN at Address_PCRS_VPN, via step 1704. Next, the PCRS_VPN communicates with the PCRS_VPN Utility 1711, via step 1741. Next, the PCRS_VPN_Profile file is accepted to start the Smart VPN connection with the PCRS_VPN at the Address_PCRS_VPN, via step 1705. Next, pee-to-peer connection is established between the PCRS_VPN and the Device Client, via step 1706. Next, the PCRS_VPN communicates with the PCRS_VPN Utility 1713, via step 1743. Next, the PCRS_VPN is logged in with the Client credentials ("Connect to PCRS_VPN", Address_PCRS_VPN, Address_PCRS_VPN_Client, Password_PCRS_VPN_P2P), via step 1707. Next, the Client credentials are sent to the PCRS_VPN Utility 1714, via step 1744. Next, the PCRS_VPN waits for authentication, via step 1708. Next, secure peer-to-peer communication starts, via step 1709. Next, the PCCBS_VPN communicates with the PCRS_VPN Utility 1717, via step 1746. Next, the PCCBS_VPN Utility establishes peer-to-peer communication channel between the PCRS_VPN and the PCCBS_VPN 1719. Next, the PCCBS establishes P2P communication channel between PCCBS VPN Device Client and PCRS Device Client or another PCCBS VPN Device Client 1721, via step 1721.

From PCRS_VPN Utility standpoint, a peer-to-peer connection request is accepted from the Address_PCRS_VPN_Client, via step 1710. Next, peer-to-peer negotiation starts using the Address_PCRS_VPN to communicate with the PCRS_VPN Client at the Address_PCRS_VPN_Client, via step 1711. Next, the PCRS_VPN Utility communicates with the PCRS_VPN 1704, via step 1741. Next, the PCRS_VPN_Profile file is sent to the Address_PCRS_VPN_Client to start the Smart VPN connection, via step 1712. Next, the PCRS_VPN_Profile file is sent to the PCRS_VPN 1705, via step 1742. Next, pee-to-peer connection is established between the PCRS_VPN and the Device Client, via step 1713. Next, the PCRS_VPN Utility communicates with the PCRS_VPN 1706, via step 1743. Next, the PCRS_VPN Client credentials ("Connect to PCRS_VPN", Address_PCRS_VPN, Address_PCRS_VPN_Client Password_PCRS_VPN_P2P) are accepted, via step 1714. Next, entry list based on the Address_PCRS_VPN_Client in the PCRS_VPN Client database (Access_Code, Code_Expiration, Address_Invitee, Address_PCRS_VPN_Client, Hash_Password_PCRS_VPN_P2P, Password_PCRS_VPN_P2P_Expiration, Status) is searched, via step 1715. Next, existing peer-to-peer (P2P) password is authenticated by checking if the hashed value matches the Hash_Password_PCRS_VPN_P2P entry based on the Address_PCRS_VPN_Client in the PCRS_VPN Client database, via step 1716. Next, existing peer-to-peer (P2P) password is sent to the PCRS_VPN 1708, via step 1745. Next, secure peer-to-peer communication starts, via step 1717. Next, the PCCBS_VPN Utility communicates with the PCRS_VPN 1709, via step 1746. Next, the PCCBS_VPN Utility establishes peer-to-peer communication channel between the PCRS_VPN and the PCCBS_VPN 1719. Next, the PCRS establishes P2P communication channel between PCCBS VPN Device Client and PCRS Device Client or another PCCBS_VPN Device Client 1721, via step 1748.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for use with a public cloud network, the method comprising:
    setting up at least one private cloud routing server (PCRS), at least one private cloud call-back server (PCCBS) and at least one smart device client in a client server relationship,
    wherein the at least one private cloud routing server includes a first message box associated with the at least one private cloud routing server-, the first message box being located on a public cloud network,
    wherein the at least one smart device client includes a second message box associated with the at least one smart device client, the second message box being located on the public cloud network, and
    wherein the at least one PCCBS hosts the first message box and the second message box on the public cloud network;
    passing a session based message between the first message box and the second message box in a secure manner;
    wherein a secure session based message connection mechanism, hosted on the at least one PCCBS between the at least one PCRS and the at least one smart device client, comprises initializing and provisioning of the at least one PCRS and the at least one PCCBS, creation of a PCCBS Client, viewing the PCCBS Client, editing a PCCBS peer-to-peer password and status of the PCCBS, changing the PCCBS peer-to-peer password by the at least one smart device client and connecting to the at least one PCRS by the at least one smart device client,
    wherein a session based message is authenticated by the at least one PCCBS and the at least one smart device client,
    wherein the at least one smart device client and the at least one PCCBS communicates with each other in response to the session based message being authenticated, and
    wherein at least one private network service is securely accessible by the at least one smart device client through the public cloud network based upon the authenticated session based message;
    setting up at least one PCCBS in a client server relationship with at least one PCRS, wherein the at least one PCCBS communicates with the at least one PCRS in response to the session based message being authenticated,
    wherein the at least one PCCBS and the at least one PCRS privately and securely communicates with each other through the public cloud network; and
    setting up the at least one smart device client in a client server relationship with the at least one PCCBS; and
    setting up at least another smart device client in a client server relationship with the at least one PCRS,
    wherein the at least one smart device client and the at least another smart device client communicates with the at least one PCCBS and the at least one PCRS in response to the session based message being authenticated, and
    wherein the at least one smart device client and the at least another smart device client privately and securely communicates with each other through the public cloud network.

2. The method of claim 1, wherein the at least one PCCBS comprises:
    a computing device;
    a connection to a network; and
    a program that executes instructions stored in memory to instruct the at least one PCCBS to:
    create and manage an authorized client list to accommodate a plurality of smart device clients,
    send a session based invitation to the second message box,
    retrieve a session based access request of the at least one smart device client from the first message box, and
    send a session based acknowledgement to the second message box.

3. The method of claim 2, wherein the program executes further instructions stored in the memory to instruct the at least one PCCBS to:
    send a communication request to the at least one smart device client;
    send a communication request to the at least one PCRS;
    bind the network connection between the at least one PCCBS and the at least one PCRS;
    route incoming request from the at least one smart device client coming on a side of the at least one PCCBS to the at least one PCRS;
    establish a secure peer-to-peer communication with the at least one smart device client on the side of the at least one PCCBS;
    enable access of the at least one private network service from the at least one smart device client on a side of the at least one PCRS;
    call back to the at least one PCRS on demand from the smart device client request for connection to the at least another smart device client reachable by the at least one PCRS in a virtual private network of the at least one PCRS; and enable private and secure communication between the at least one smart device client on the side of the at least one PCCBS and the at least another smart device client on the side of the at least one PCRS.

4. The method of claim 2, wherein the at least one smart device client on the side of the at least one PCCBS, comprises:
a computing device; and
a connection through a router to a network;
wherein the router has a program that executes instructions stored in memory to instruct the at least one smart device client to:
retrieve a session based invitation from the at least one smart device client message box;
send a session based access request to the at least one PCRS message box;
retrieve a session based acknowledgement from the at least one smart device client message box;
send a communication request to the at least one PCCBS;
send a communication request to the at least one smart device client;
bind the network connection between the at least one PCCBS and the at least one smart device client;
route an incoming request from the at least one PCCBS to the at least one smart device client;
establish a secure peer-to-peer communication with the at least one PCCBS;
access the at least one private network service through the at least one PCCBS; and
communicate with at least another smart device client on a side of the at least one PCRS through the at least one PCRS.

5. The method of claim 4, wherein the program:
accesses the at least one PCRS behind a firewall with fixed or dynamic IP addresses;
wherein the at least one smart device client on the side of the at least one PCCBS requires no public cloud based routing server in a wide area network (WAN), requires no additional router setup in a local area network (LAN), and establishes a secure peer-to-peer communication channel with the at least one PCRS;
accesses a private network service through the at least one PCCBS and the at least one PCRS; and
communicates with at least another smart device client on the side of the at least one PCRS through the at least one PCRS.

6. The method of claim 4, wherein the program:
accesses the at least one PCRS behind a firewall with fixed or dynamic IP addresses,
wherein the at least one smart device client requires no public cloud based routing server in a wide area network (WAN), requires no additional router setup in the a local area network (LAN), and establishes a secure peer-to-peer communication channel with the at least one PCRS;
maps local physical I/O to a virtual private cloud routing server I/O;
accesses a private network service through the at least one PCRS; and
communicates with at least another smart device client through the at least one PCRS.

7. The method of claim 2, wherein the at least one smart device client on a side of the at least one PCRS, comprises:
a computing device;
a connection to a network, wired or wireless; and
a program that executes instructions stored in memory to instruct the at least one smart device client to:
retrieve a session based invitation from the at least one smart device client message box;
send a session based reply to the at least one PCRS message box;
retrieve a session based acknowledgement from the at least one smart device client message box;
send an access request to the at least one PCRS;
wait for the at least one PCRS response;
bind the network connection between the at least one PCRS and the at least one smart device client;
route incoming request from the at least one PCRS to the at least one smart device client;
establish a secure peer-to-peer communication with the at least one PCRS;
access the at least one private network service through the at least one PCRS; and
communicate with the at least another smart device client on a side of the at least one PCCBS through the at least one PCCBS.

8. The method of claim 7, wherein the program:
accesses the at least one PCRS behind the firewall with fixed or dynamic IP addresses, wherein the at least one smart device client requires no public cloud based routing server in a wide area network (WAN), requires no additional router setup in a local area network (LAN), and establishes a secure peer-to-peer communication with the at least one PCRS;
maps local physical I/O to virtual server I/O;
accesses private network service through the at least one PCRS; and
communicates with the at least another smart device client through the at least one PCRS.

9. The method of claim 1, wherein the at least one PCRS comprises:
a computing device;
a connection to a network; and
a program that executes instructions stored in memory to instruct the at least one PCRS to:
create and manage an authorized client list to accommodate a plurality of smart device clients;
send a session based invitation to the second message box;
retrieve a session based access request of the at least one smart device client from the first message box; and
send a session based acknowledgement to the second message box.

10. The method of claim 9, wherein the program executes further instructions stored in memory to instruct the at least one PCRS to:
send a communication request to the at least one smart device client;
send a communication request to the at least one PCRS;
bind the network connection between the at least one PCRS and the at least one PCCBS;
route an incoming request from the at least one smart device client coming on a side of the at least one PCRS to the at least one PCRS;
establish a secure peer-to-peer communication with the at least one smart device client on a side of the at least one PCRS;
enable access of the at least one private network service from the at least one smart device client on the side of the at least one PCRS; and enable private and secure communication between the at least one smart device client on a side of the at least one PCCBS and the at least another smart device client on the side of the at least one PCRS.

11. A method for providing a secure session based message connection mechanism between a private cloud call-back server (PCCBS) and at least one smart device client in a PCCBS network, the method comprising:
setting up the private cloud call-back server (PCCBS) and the at least one smart device client in a client server relationship,
wherein the PCCBS includes a routing server message box utility to access a first message box located on a public cloud network,
wherein the PCCBS registers public and private IP addresses of the at least one smart device client,
wherein the at least one smart device includes a client message box utility to access second message box located on the public cloud network, and
wherein the PCCBS sends a session based acknowledgement with public and private IP addresses of the PCCBS to the second message box;
passing, by the routing server message box utility of the PCCBS, a session based message between the first message box and the second message box in a security process, wherein the security process to pass the session based message between the first message box and the second message box of the PCCBS and the at least one smart device client, respectively, includes:
initializing and provisioning of the PCCBS,
creating a PCCBS Client,
viewing the PCCBS Client,
editing a PCCBS peer-to-peer password and status of the PCCBS,
changing the PCCBS peer-to-peer password by the at least one smart device client, and
connecting to the PCCBS by the at least one smart device client;
wherein the at least one smart device client connects to the PCCBS by at least one connection of:
the at least one smart device client determines a target is in a locally accessible Local Area Network (LAN) and decides to connect to the PCCBS directly,
the at least one smart device client determines the target is not in the locally accessible LAN and decides to connect through a WAN to the public cloud network, and wherein the WAN locates a router and the LAN and connects to the PCCBS; and
the at least one smart device client determines the target is not in the locally accessible LAN and decides the LAN and the router, and connects to public cloud network in the WAN,
wherein a secure session based message is authenticated by the PCCBS and the at least one smart device client,
wherein the at least one smart device client and the PCCBS communicates with each other after the session based message is authenticated, and
wherein a private network service is then securely accessible by the at least one smart device client through public cloud network based upon the authenticated session based message; and
setting up at east another smart device client in a client server relationship with the PCCBS,
wherein the at least one smart device client and the at least another smart device client communicates with the PCCBS after the session based message, is authenticated, and
wherein the at least one smart device client and the at least another smart device client privately and securely communicates with each other through the public cloud network.

12. A method for a communication flow of a connection mechanism between at least one private call-back back server (PCCBS) Device Client and at least one private cloud routing server (PCRS) Device Client through a Cloud Network, the method comprising:
requesting by an application on the at least one PCCBS Device Client to connect to a server portion of a PCCBS Utility on a PCCBS through a Client Message Box, wherein the server portion of the PCCBS Utility receives a registration through a routing server message box;
registering by the at least one PCRS Device Client to a PCRS Utility;
registering the PCRS Utility to the server portion of the PCCBS Utility by sending registration information to the server portion of the PCCBS Utility;
receiving by a client portion of the PCCBS Utility the registration information from the server portion of the PCCBS Utility;
calling back to the PCRS Utility by the server portion of the PCCBS Utility of an intention to connect;
sending a communication request from the PCRS Utility to the at least one PCRS Device Client; and
starting peer-to-peer communication from the PCCBS Device Client to the client portion of the PCCBS Utility, and then to the server portion of the PCCBS Utility, and then from the server portion of the PCCBS Utility to the PCRS Utility and finally to the PCRS Device Client.

13. The method of claim 12,
wherein a Call-Back Server Message Box or the Client Message Box is hosted inside at least one of an email server, text message server, web server, or a server that is configured to host a secure message for information exchange between the PCCBS and the PCCBS Device Client; and
wherein the Call-Back Server Message Box or the Client Message Box is accessible and under secure and private control of either the PCCBS or the PCCBS Device Client.

14. The method of claim 12, further comprising providing a secure session based message connection mechanism between a private cloud routing server (PCRS) and at least one smart device client in a PCRS network, including:
initializing and provisioning of the PCRS;
creating a PCRS Client;
viewing the PCRS Client;
editing a PCRS peer-to-peer password and status of the PCRS;
changing the PCRS peer-to-peer password by the at least one smart device client;
resetting the PCRS peer-to-peer password and status by an administrator from a PCRS LAN;
connecting to the client portion of the PCCBS; and
connecting to the PCRS by the at least one smart device client.

15. A non-transitory computer-readable medium storing executable instructions that, in response to execution, cause a computer to perform operations comprising:

setting up a private cloud call-back server (PCCBS) and
a smart device client in a client server relationship,
  wherein the PCCBS includes a routing server message
    box utility to access a first message box located on a
    public cloud network,
  wherein the PCCBS registers public and private IP
    addresses of the smart device client,
  wherein the smart device client includes a client message
    box utility to access a second message box
    located on the public cloud network,
  wherein the PCCBS sends a session based acknowledgement
    with public and private IP addresses of the
    PCCBS to the second message box; passing, by the
    routing server message box utility of the PCCBS, a
    session based message between the first message box
    and the second message box in a security process,
  wherein the security process to pass the session based
    message between the first message box and the
    second message box of the PCCBS and the smart
    device client, respectively, includes:
  initializing and provisioning of the PCCBS,
  creation of a PCCBS Client,
  viewing the PCCBS Client,
  editing a peer-to-peer password and status of the
    PCCBS, and
  changing a PCCBS peer-to-peer password by the smart
    device client and connecting to the PCCBS by the
    smart device client,
wherein the smart device client connects to the PCCBS by
  at least one connection of:
  the smart device client determines a target is in a locally
    accessible Local Area Network (LAN) and decides
    to connect to the PCCBS directly,
  the smart device client determines the target is not in
    the locally accessible LAN and decides to connect
    through a WAN to the public cloud network, and
    wherein the WAN locates a router and the LAN and
    connects to the PCCBS, and
  the smart device client determines the target is not in
    the locally accessible LAN and decides to pass
    through the LAN and the router, and connects to the
    public cloud network in the WAN,
  wherein a secure session based message is authenticated
    by the PCCBS and the smart device client,
  wherein the smart device client and the PCCBS communicates
    with each other after the session based
    message is authenticated,
  wherein a private network service is then securely
    accessible by the smart device client through the
    public cloud network based upon the authenticated
    session based message; and
setting up at least another smart device client in a client
  server relationship with the PCCBS,
  wherein the smart device client and the at least another
    smart device client communicates with the PCCBS
    after the session based message is authenticated, and
  wherein the smart device client and the at least another
    smart device client privately and securely communicates
    with each other through the public cloud
    network.

16. A non-transitory computer-readable medium storing executable instructions that, in response to execution, cause a computer to perform operations comprising:
  requesting by a client device application to connect to a
    private cloud call-back server (PCCBS) Utility through
    a Client Message Box, wherein a server portion of the
    PCCBS Utility receives a registration through a routing
    server message box;
  requesting by a PCCBS Client Device to the server
    portion of the PCCBS Utility through the Client Message
    Box a connection to a client portion of the PCCBS
    Utility;
  receiving by the server portion of the PCCBS Utility the
    request through a Routing Server Message Box;
  notifying the client portion of the PCCBS Utility by the
    server portion of the PCCBS utility of an intention of
    the server portion to connect;
  replying by the client portion of the PCCBS Utility with
    a registration to the server portion of the PCCBS
    Utility; responding by the server portion of the PCCBS
    Utility to the client device application through the
    Routing Server Message Box;
  sending a communication request through the client portion
    of the PCCBS to the at least one private cloud
    routing server (PCRS);
  registering by the PCCBS Utility the public and private IP
    addresses of the PCCBS Client Device;
  sending by the PCCBS Utility a session-based acknowledgement
    with the public and private IP addresses of
    the PCCBS to the Client Message Box; and
  starting peer-to-peer communication between the PCCBS
    Client Device and the client portion of the PCCBS
    Utility,
  wherein information exchange between the PCCBS Utility
    and the PCCBS Client Device is through the Routing
    Server Message Box and the Client Message Box,
  wherein the PCCBS Client Device connects to the client
    portion of the PCCBS Utility by at least one connection
    of:
  the PCCBS Client Device determines the client portion of
    the PCCBS Utility is in a locally accessible Local Area
    Network (LAN) and decides to connect to the PCCBS
    Utility directly,
  the PCCBS Client Device determines the client portion of
    the PCCBS Utility is not in the locally accessible LAN
    and decides to connect through a WAN to the cloud
    network, and wherein the WAN locates a router and the
    LAN, and connects to the PCCBS Utility, and
  the PCCBS Client Device determines the client portion of
    the PCCBS Utility is not in the locally accessible LAN
    and decides to pass through the LAN and the router,
    and connects to the cloud network in the WAN.

* * * * *